(12) United States Patent
Kisu et al.

(10) Patent No.: US 7,201,867 B2
(45) Date of Patent: Apr. 10, 2007

(54) METHOD OF INSTALLING CIRCUIT MEMBER IN RESIN-MOLDED PANEL

(75) Inventors: Naomi Kisu, Susono (JP); Emi Soshino, Susono (JP)

(73) Assignee: Yazaki Corporation, Tokyo (JP)

( * ) Notice: Subject to any disclaimer, the term of this patent is extended or adjusted under 35 U.S.C. 154(b) by 309 days.

(21) Appl. No.: 10/418,126

(22) Filed: Apr. 18, 2003

(65) Prior Publication Data

US 2003/0218279 A1 Nov. 27, 2003

(30) Foreign Application Priority Data

Apr. 25, 2002 (JP) ............................ P2002-124846
Jan. 22, 2003 (JP) ............................ P2003-013572

(51) Int. Cl.
*B29C 51/10* (2006.01)
(52) U.S. Cl. .................. 264/510; 264/553; 264/554; 264/263; 264/272.11; 264/272.15
(58) Field of Classification Search ................ None
See application file for complete search history.

(56) References Cited

U.S. PATENT DOCUMENTS 3,042,137 A * 7/1962 Mathues et al. ............ 180/90
3,168,617 A * 2/1965 Richter ................... 174/117 FF
4,885,838 A * 12/1989 Ruecker et al. ............ 29/566.3
4,923,537 A * 5/1990 Matsushima ................. 156/48
5,732,457 A * 3/1998 Ishiwata et al. ........... 29/564.7
5,918,365 A * 7/1999 Uchida et al. ................ 29/868
6,031,184 A * 2/2000 Ichikawa et al. ........ 174/72 TR
6,272,746 B1 * 8/2001 Mori ........................... 29/868
6,578,263 B2 * 6/2003 Ichikawa et al. ............. 29/870

FOREIGN PATENT DOCUMENTS

JP            09-019035            1/1997

* cited by examiner

*Primary Examiner*—Edmund H. Lee
(74) *Attorney, Agent, or Firm*—Sughrue Mion, PLLC

(57) ABSTRACT

A method includes a first, a second and a third step, and a circuit member is installed in a resin-molded panel simultaneously when this resin-molded panel is vacuum formed. In the first step, the circuit member to be installed is placed on an upper surface of a circuit member-installing portion formed on and projecting from a front surface of a base mold. In the second step, a heated and softened panel material is laid on the front surface of the base mold. In the third step, the air between the panel material and the base mold is drawn via notch spaces and air-drawing holes.

10 Claims, 24 Drawing Sheets

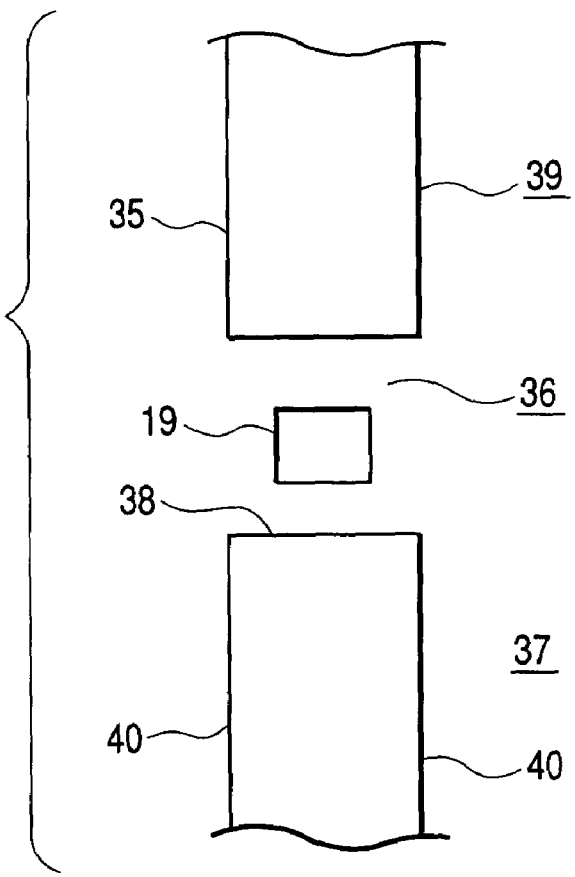
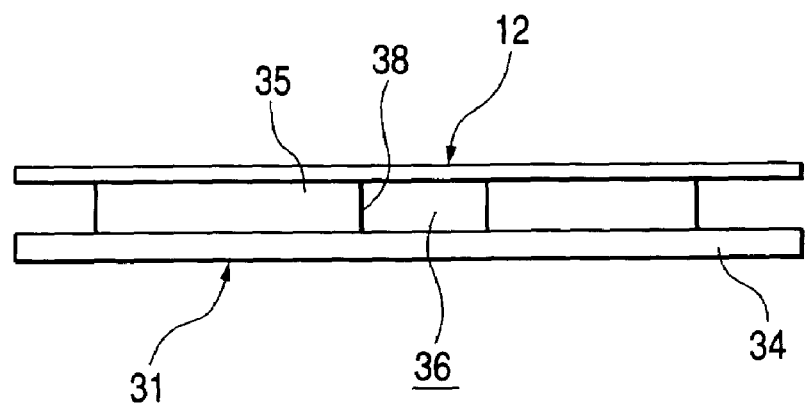

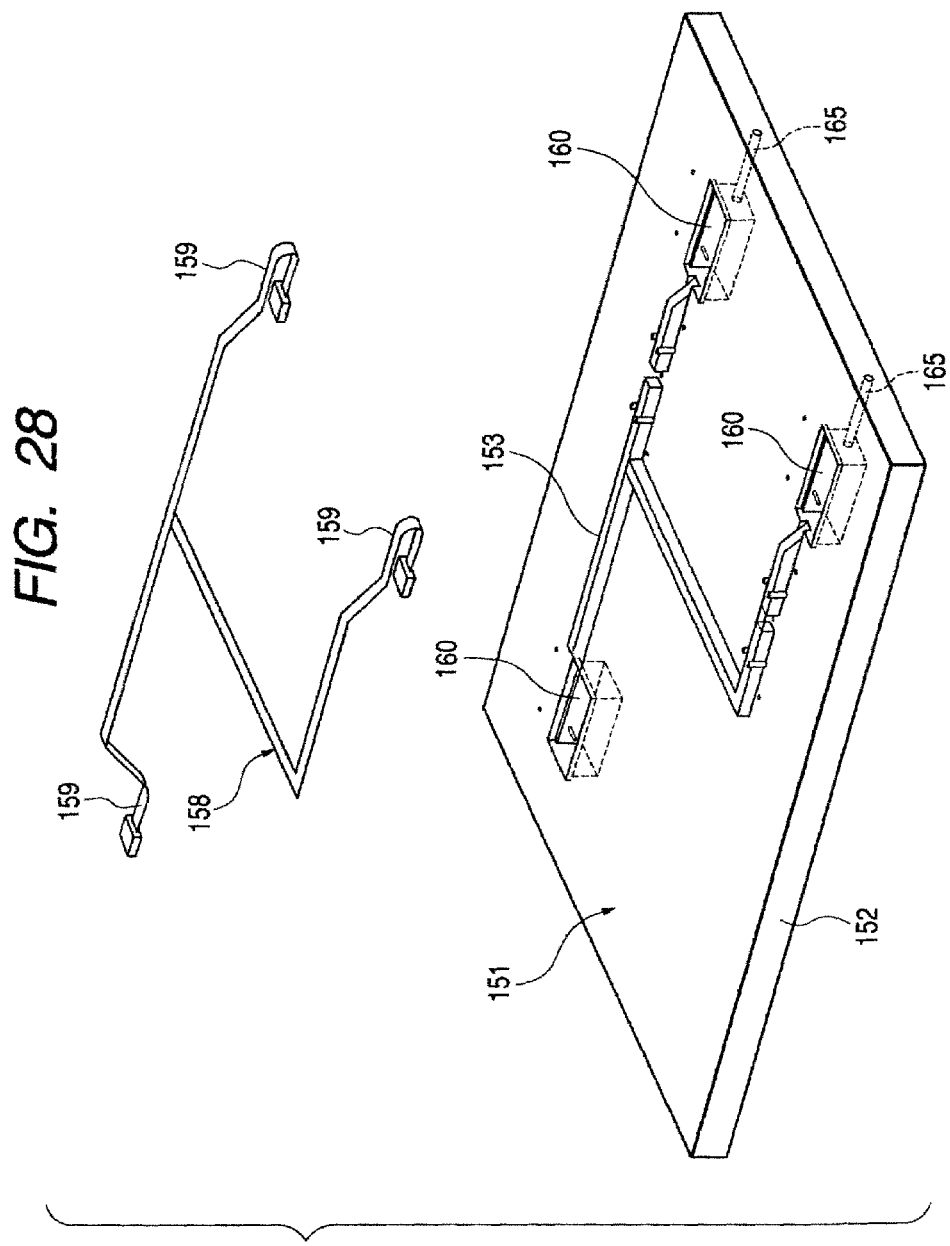

METHOD OF INSTALLING CIRCUIT MEMBER IN RESIN-MOLDED PANEL

The present application is based on Japanese Patent Application Nos. 2002-124846 and 2003-013572, the entire contents of which are incorporated herein by reference.

BACKGROUND OF THE INVENTION

1. Field of the Invention

This invention relates to a method of installing a circuit member in a resin-molded panel and also to a vacuum forming mold for installing the circuit member.

2. Related Art

Fastening members, such as clamps, have heretofore been used for mounting a wire harness (circuit member) on a panel of a vehicle such as an automobile, and these clamps have been fixedly secured to the panel to effect the mounting of the wire harness. There is also known a structure for fixing a wire harness, disclosed for example in Japanese Patent Publication No. JP H09-19035A.

In recent years, various parts of an automobile have been modularized. There has been proposed a construction in which a wire harness is incorporated in a resin-molded panel. As such proposed construction of incorporating a wire harness in a resin-molded panel, there is known a method of installing a circuit member in a resin-molded panel by the use of a vacuum forming method as shown in FIG. 31. More specifically, there is known the method of installing the circuit member in the resin-molded panel, in which the resin-molded panel 1 is molded by vacuum forming, and thereafter the circuit member 3 is mounted in a circuit member-installing groove 2 in the resin-molded panel 1.

In FIGS. 31 and 32, the circuit member 3 comprises flat circuit member formed by integrally connecting a plurality of wires 4 together in a juxtaposed manner, and a plurality of retaining convex portions 5 for preventing the withdrawal of the circuit member 3 are formed on the circuit member-installing groove portion 2 which receives the circuit member 3 therein. These retaining convex portions 5 are each in the form of a claw-like small projection, and are formed on opposed side edges of an opening of the circuit member-installing groove 2, and are arranged in a staggered manner.

The above related art technique has several problems as follows. Firstly, it is difficult to form small, fine claw-like projections, such as the retaining convex portions 5, by vacuum forming, and undercuts are formed at the retaining convex portions 5, respectively, and this invites a problem that the productivity is lowered.

Secondly, there is encountered a problem that with the small, fine claw-like projections such as the retaining convex portions 5, the holding and fixing of the circuit member 3 are not sufficient.

Thirdly, there is encountered a problem that the retaining convex portions 5 prevent the installation of the circuit member 3, so that the time and labor, required for the operation, increase.

Fourthly, the circuit member-installing groove 2 is usually formed such that its width is larger than the width of the circuit member 3, and besides the groove bottom surface is flat and slippery, and therefore there is encountered a problem that the circuit member 3 is displaced laterally.

SUMMARY OF THE INVENTION

This invention has been made under the above circumstances, and an object of the invention is to provide a method of installing a circuit member in a resin-molded panel, in which the productivity, the operation efficiency and a fixed condition of the circuit member can be enhanced. Another object is to provide a vacuum forming mold for achieving such a method of installing the circuit member in the resin-molded panel.

(1) A method of installing a circuit member in a resin-molded panel according to the invention is characterized in that the method comprises a first step of placing the circuit member to be installed on an upper surface of a circuit member-installing portion formed on and projecting from a front surface of a base mold of a vacuum forming mold; a second step of laying, after the first step, a heated and softened panel material on the front surface of the base mold in a manner to cover the circuit member placed on the upper surface of the circuit member-installing portion; and a third step of drawing, after the second step, the air between the panel material and the base mold via a notch space, formed by cutting upper and side surfaces of the circuit member-installing portion, and an air-drawing hole formed in the base mold and communicating with the notch space; whereby the circuit member is installed in the resin-molded panel simultaneously when the resin-molded panel is vacuum formed.

(2) A method of installing a circuit member in a resin-molded panel according to the invention is characterized in that the method comprises a first step of placing the circuit member to be installed on an upper surface of a circuit member-installing portion formed on and projecting from a front surface of a base mold of a vacuum forming mold; a second step of laying, after the first step, a heated and softened panel material on the front surface of the base mold in a manner to cover the circuit member placed on the upper surface of the circuit member-installing portion; and a third step of drawing, after the second step, the air between the panel material and the base mold via a step space, formed by a step between an axial end of the circuit member-installing portion and the base mold, and an air-drawing hole formed in the base mold and communicating with the step space; whereby the circuit member is installed in the resin-molded panel simultaneously when the resin-molded panel is vacuum formed.

(3) A method of installing a circuit member in a resin-molded panel according to the invention is characterized in that before the second step, a circuit member-holding member, which is separate from the circuit member-installing portion, is attached to the circuit member-installing portion to prevent the lifting of the circuit member.

(4) A method of installing a circuit member in a resin-molded panel according to the invention is characterized in that the method comprises a first step of placing the circuit member to be installed on a front surface of a base mold of a vacuum forming mold astride a recess formed in the front surface of the base mold; a second step of laying, after the first step, a heated and softened panel material on the front surface of the base mold in a manner to cover the circuit member; and a third step of drawing, after the second step, the air between the panel material and the base mold via the recess and an air-drawing hole formed in the base mold and communicating with the recess; whereby the circuit member is installed in the resin-molded panel simultaneously when the resin-molded panel is vacuum formed.

(5) A vacuum forming mold of the invention is a vacuum forming mold for installing a circuit member in a resin-molded panel simultaneously when the resin-molded panel is vacuum formed, characterized in that the mold includes a base mold; a circuit member-installing portion which is formed on and projects from a front surface of the base mold, and has an upper surface on which the circuit member can be placed; a notch space formed by cutting upper and side surfaces of the circuit member-installing portion; and an air-drawing hole which is formed in the base mold, and communicates with the notch space, and can draw the air between a heated and softened panel material, laid on the front surface of the base mold in a manner to cover the circuit member placed on the upper surface of the circuit member-installing portion, and the base mold via the notch space.

(6) A vacuum forming mold of the invention is characterized in that the notch space is formed to interrupt the circuit member-installing portion.

(7) A vacuum forming mold of the invention is characterized in that a notch is formed in the circuit member-installing portion to form the notch space such that tapering surfaces are continuous with the side surfaces of the circuit member-installing portion.

(8) A vacuum forming mold of the invention is a vacuum forming mold for installing a circuit member in a resin-molded panel simultaneously when the resin-molded panel is vacuum formed, characterized in that the mold includes a base mold; a circuit member-installing portion which is formed on and projects from a front surface of the base mold, and has an upper surface on which the circuit member can be placed; a step space formed by a step between an axial end of the circuit member-installing portion and the base mold; and an air-drawing hole which is formed in the base mold, and communicates with the step space, and can draw the air between a heated and softened panel material, laid on the front surface of the base mold in a manner to cover the circuit member placed on the upper surface of the circuit member-installing portion, and the base mold via the step space.

(9) A vacuum forming mold of the invention is characterized in that circuit member-positioning portions are formed on the base mold and/or the circuit member-installing portion, and are disposed respectively at opposite sides of the circuit member so as to position the circuit member.

(10) A vacuum forming mold of the invention is characterized in that circuit member-positioning portions for insertion into the circuit member to position the same are formed on the circuit member-installing portion.

(11) A vacuum forming mold of the invention is characterized in that the circuit member-installing portion is formed into such a configuration that a circuit member-holding member for preventing the lifting of the circuit member can be attached to the circuit member-installing portion.

(12) A vacuum forming mold of the invention is a vacuum forming mold for installing a circuit member in a resin-molded panel simultaneously when the resin-molded panel is vacuum formed, characterized in that the mold includes a base mold having a front surface on which the circuit member can be placed; a recess which is formed in the front surface of the base mold such that the circuit member can be disposed astride the recess; and an air-drawing hole which is formed in the base mold, and communicates with the recess, and can draw the air between a heated and softened panel material, laid on the front surface of the base mold in a manner to cover the circuit member, and the base mold via the recess.

(13) A vacuum forming mold of the invention is characterized in that circuit member-positioning portions are formed on the basemold, and are disposed respectively at opposite sides of the circuit member so as to position the circuit member.

(14) A vacuum forming mold of the invention is characterized in that circuit member-positioning portions for insertion into the circuit member to position the same are formed on the base mold.

(15) A vacuum forming mold of the invention is characterized in that a channel-shaped receiving recess for receiving an end portion of the circuit member is formed in the base mold.

(16) A vacuum forming mold of the invention is characterized in that a holder portion for holding the end portion is formed in the receiving recess.

(17) A vacuum forming mold of the invention is characterized in that a lid member for closing the receiving recess is releasably provided at the receiving recess.

(18) A vacuum forming mold of the invention is characterized in that removal means for assisting in removing the lid member from the receiving recess is provided at the receiving recess.

(19) A vacuum forming mold of the invention is characterized in that the removal means includes an air introduction passage, communicating with the receiving recess, and an air introducing apparatus for feeding the air to the receiving recess via the air introduction passage.

(20) A vacuum forming mold of the invention is characterized in that a box-like receiving box member for receiving an end portion of the circuit member is releasably mounted on the base mold.

In the invention, through the first, second and third steps, the circuit member can be installed in the resin-molded panel simultaneously when this resin-molded panel is vacuum formed. In the first step, the circuit member to be installed is placed on the upper surface of the circuit member-installing portion formed on and projecting from the front surface of the base mold. In the second step, the heated and softened panel material is laid on the front surface of the base mold. The heated and softened panel material is laid in a manner to cover the circuit member placed on the upper surface of the circuit member-installing portion. In the third step, the air between the panel material and the base mold is drawn via the notch space and the air-drawing hole. When the air between the panel material and the base mold is drawn, the heated and softened panel material is drawn and fitted into the notch space, and also is brought into intimate contact with the circuit member to thereby fixedly hold this circuit member. The heated and softened panel material is molded in conformity with the configuration of the circuit member.

In the invention, through the first, second and third steps, the circuit member can be installed in the resin-molded panel simultaneously when this resin-molded panel is vacuum formed. In the first step, the circuit member to be installed is placed on the upper surface of the circuit member-installing portion formed on and projecting from the front surface of the basemold. In the second step, the heated and softened panel material is laid on the front surface of the base mold. The heated and softened panel material is laid in a manner to cover the circuit member placed on the upper surface of the circuit member-installing portion. In the third step, the air between the panel material and the base mold is drawn via the step space and the air-drawing hole. When the air between the panel material and the base mold is drawn, the heated and softened panel material is drawn and fitted into the step space, and also is brought into intimate contact with the circuit member to thereby fixedly hold this circuit member. The heated and softened panel material is molded in conformity with the configuration of the circuit member.

In the invention, the circuit member-holding member is used for preventing the lifting of the circuit member placed on the upper surface of the circuit member-installing portion. This circuit member-holding member is attached to the circuit member-installing portion before the second step. The lifting of the circuit member is thus prevented by the circuit member-holding member, and therefore the installed condition of the circuit member after the molding is stable, and besides the constant quality of the production configuration is achieved.

In the invention, through the first, second and third steps, the circuit member can be installed in the resin-molded panel simultaneously when this resin-molded panel is vacuum formed. In the first step, the circuit member to be installed is placed on the front surface of the base mold astride the recess formed in the front surface of the base mold. In the second step, the heated and softened panel material is laid on the front surface of the base mold. The heated and softened panel material is laid in a manner to cover the circuit member. In the third step, the air between the panel material and the base mold is drawn via the recess and the air-drawing hole. When the air between the panel material and the base mold is drawn, the heated and softened panel material is drawn and fitted into the recess (recess space), and also is brought into intimate contact with the circuit member to thereby fixedly hold this circuit member. The heated and softened panel material is molded in conformity with the configuration of the circuit member.

In the invention, the vacuum forming mold includes the base mold, the circuit member-installing portion, the notch space, and the air-drawing hole. By using this vacuum forming mold, the circuit member can be installed in the resin-molded panel simultaneously when this resin-molded panel is vacuum formed. The circuit member-installing portion is formed on and projects from the front surface of the base mold, and the circuit member to be installed is placed on the upper surface of the circuit member-installing portion. Then, the heated and softened panel material is laid on the front surface of the base mold in a manner to cover the circuit member, and the air between the panel material and the base mold is drawn via the notch space and the air-drawing hole, so that the heated and softened panel material is drawn and fitted into the notch space, and also is brought into intimate contact with the circuit member to thereby fixedly hold this circuit member. The heated and softened panel material is molded in conformity with the configuration of the circuit member.

In the invention, the notch space is formed to interrupt the circuit member-installing portion. Because of the provision of this notch space, those opposed portions of the panel material, drawn into the notch space from the opposite sides of the circuit member, can be brought into intimate contact with each other at their distal ends. The distal ends can be fused together, depending on the softened condition of the panel material. Therefore, the circuit member is more positively held and fixed.

In the invention, the notch space is formed by forming the notch such that the tapering surfaces are formed. The heated and softened panel material can be smoothly drawn and fitted into this notch space. The configuration quality of that portion of the resin-molded panel, fixedly holding the circuit member, is ensured.

In the invention, the vacuum forming mold includes the base mold, the circuit member-installing portion, the step space, and the air-drawing hole. By using this vacuum forming mold, the circuit member can be installed in the resin-molded panel simultaneously when this resin-molded panel is vacuum formed. The circuit member-installing portion is formed on and projects from the front surface of the base mold, and the circuit member to be installed is placed on the upper surface of the circuit member-installing portion. Then, the heated and softened panel material is laid on the front surface of the base mold in a manner to cover the circuit member, and the air between the panel material and the base mold is drawn via the step space and the air-drawing hole, so that the heated and softened panel material is drawn and fitted into the step space, and also is brought into intimate contact with the circuit member to thereby fixedly hold this circuit member. The heated and softened panel material is molded in conformity with the configuration of the circuit member.

In the invention, the circuit member-positioning portions are formed on the base mold and/or the circuit member-installing portion. The circuit member-holding portions function to hold the circuit member therebetween. With this construction, the circuit member to be installed can be positively placed on the upper surface of the circuit member-installing portion without displacement. Therefore, the installed condition of the circuit member after the molding is stable, and the constant quality of the product configuration is achieved.

In the invention, the circuit member-positioning portions are formed on the circuit member-installing portion. The circuit member-positioning portions are formed into such a shape as to be inserted into the circuit member. With this construction, the circuit member to be installed can be positively placed on the upper surface of the circuit member-installing portion without displacement. Therefore, the installed condition of the circuit member after the molding is stable, and the constant quality of the product configuration is achieved.

In the invention, the circuit member-holding member can be attached to the circuit member-installing portion. The circuit member-holding member is provided for preventing the lifting of the circuit member placed on the upper surface of the circuit member-installing portion. The lifting of the circuit member is thus prevented by the circuit member-holding member, and therefore the installed condition of the circuit member after the molding is stable, and the constant quality of the product configuration is achieved.

In the invention, the vacuum forming mold includes the base mold, the recess, and the air-drawing hole. By using this vacuum forming mold, the circuit member can be installed in the resin-molded panel simultaneously when this resin-molded panel is vacuum formed. The recess is formed in the front surface of the base mold, and the circuit member to be installed is placed on the front surface of the base mold astride this recess. Then, the heated and softened panel material is laid on the front surface of the base mold in a manner to cover the circuit member, and the air between the panel material and the base mold is drawn via the recess and the air-drawing hole, so that the heated and softened panel material is drawn and fitted into the recess (recess space), and also is brought into intimate contact with the circuit member to thereby fixedly hold this circuit member. The heated and softened panel material is molded in conformity with the configuration of the circuit member.

In the invention, the circuit member-positioning portions are formed on the base mold. The circuit member-positioning portions function to hold the circuit member therebetween. With this construction, the circuit member to be installed can be positively placed on the base mold without displacement. Therefore, the installed condition of the circuit member after the molding is stable, and the constant quality of the product configuration is achieved.

In the invention, the circuit member-positioning portions are formed on the base mold. The circuit member-positioning portions are formed into such a shape as to be inserted into the circuit member. With this construction, the circuit member to be installed can be positively placed on the base mold without displacement. Therefore, the installed condition of the circuit member after the molding is stable, and the constant quality of the product configuration is achieved.

In the invention, the receiving recess is formed in the base mold. This receiving recess is formed into a channel shape so as to receive the end portion of the circuit member. Thanks to the provision of this receiving recess, the processing of the end portion of the long circuit member at the time of molding can be effected easily.

In the invention, the holder portion is formed in the receiving recess. With this construction, the end portion, received in the receiving recess, is prevented from projecting outwardly therefrom. Therefore, the constant quality of the production configuration after the molding is achieved.

In the invention, the receiving recess is closed by the lid member. Therefore, even if the heated and softened panel material falls into the receiving recess without such a lid member, such falling is prevented by the lid member. Therefore, the constant quality of the production configuration after the molding is achieved.

In the invention, the removal of the lid member is assisted by the removal means. Therefore, the end portion, received in the receiving recess, can be easily taken out from this recess after the molding.

In the invention, the removal means includes the air introduction passage, and the air introducing apparatus. With this construction, the air can be introduced into the receiving recess. Therefore, the removing operation can be carried out easily.

In the invention, the receiving box member is releasably mounted on the base mold. This receiving box member is formed into such a box-shape as to received the end portion of the circuit member. Thanks to the provision of this receiving box member, the processing of the end portion of the long circuit member at the time of molding can be effected easily.

BRIEF DESCRIPTION OF THE DRAWINGS

FIG. 1A is an exploded, perspective view explanatory of a method of installing a circuit member in a resin-molded panel, and FIG. 1B is a perspective view of a circuit member-incorporating resin-molded panel;

FIG. 6A is an exploded, perspective view explanatory of a method of installing a circuit member in a resin-molded panel, and FIG. 6B is a perspective view of a circuit member-incorporating resin-molded panel;

FIG. 7 is a plan view of a circuit member-installing portion of a vacuum forming mold;

FIG. 8 is a side-elevational view explanatory of the method of installing the circuit member in the resin-molded panel;

FIG. 9A is an exploded, perspective view explanatory of a method of installing a circuit member in a resin-molded panel, and FIG. 9B is a perspective view of a circuit member-incorporating resin-molded panel;

FIG. 11A is an exploded, perspective view explanatory of a method of installing a circuit member in a resin-molded panel, and FIG. 11B is a perspective view of a circuit member-incorporating resin-molded panel;

FIG. 14A is a cross-sectional view of a notch space portion, and FIG. 14B is a cross-sectional view of a circuit member-positioning portion.

FIG. 20A is a cross-sectional view in the case of using a flat cable, and FIG. 20B is a cross-sectional view in the case of using a bundle-type cable;

FIG. 21A is a perspective view, and FIG. 21B is an enlarged perspective view of an important portion.

FIG. 23A is a perspective view, and FIG. 23B is an enlarged perspective view of an important portion.

FIG. 24A is a perspective view showing its reverse side, and FIG. 24B is a perspective view showing its front side.

FIG. 28 is a perspective view of the vacuum forming mold of FIG. 27 and a circuit member, showing their appearances;

FIG. 31A is a plan view, and FIG. 31B is a cross-sectional view taken along the line A—A; FIG. 32A is a plan view, and FIG. 32B is a cross-sectional view taken along the line B—B.

DETAILED DESCRIPTION OF THE PREFERRED EMBODIMENTS

A preferred embodiment of the present invention will now be described with reference to the drawings.

Figure 1A:
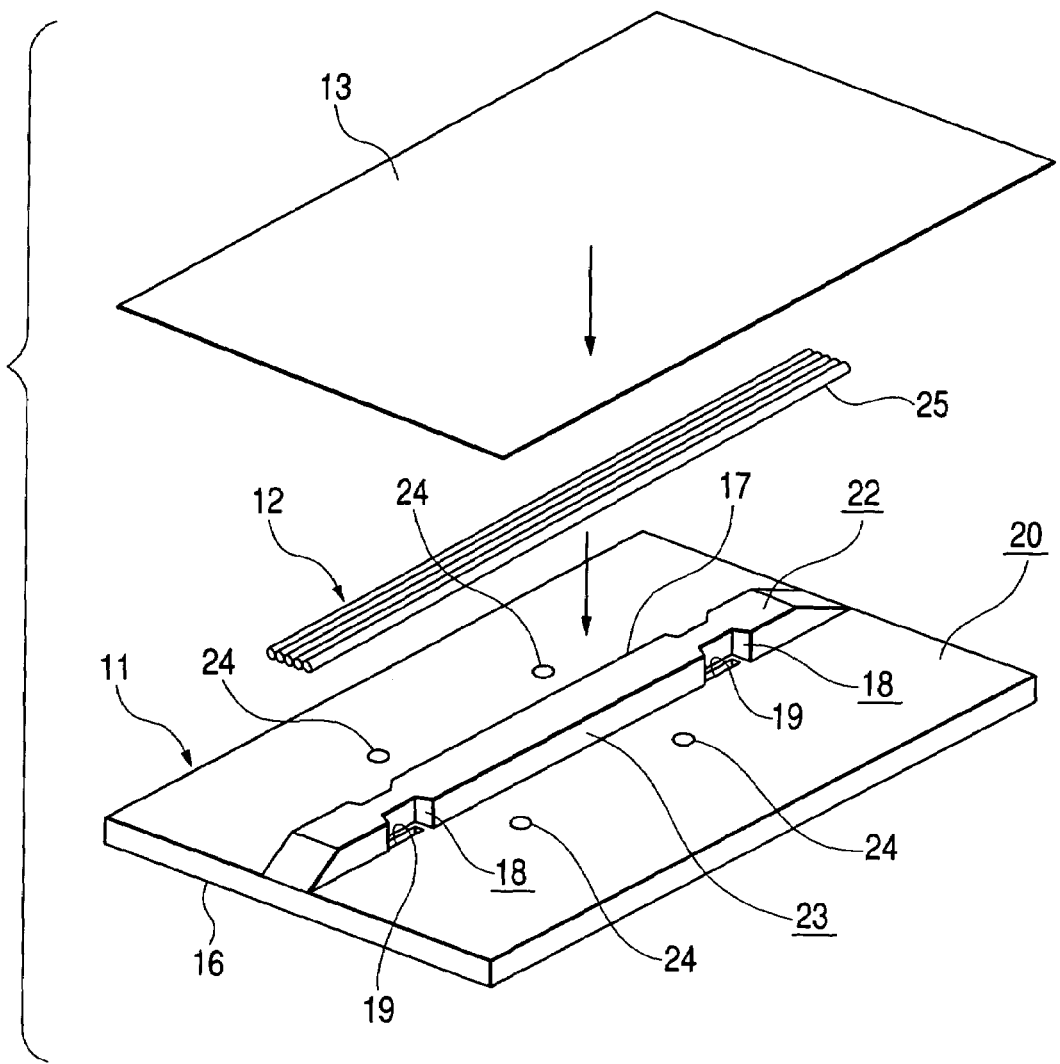
FIGS. 1A and 1B are views showing one preferred embodiment of the present invention.
Figure 1B:
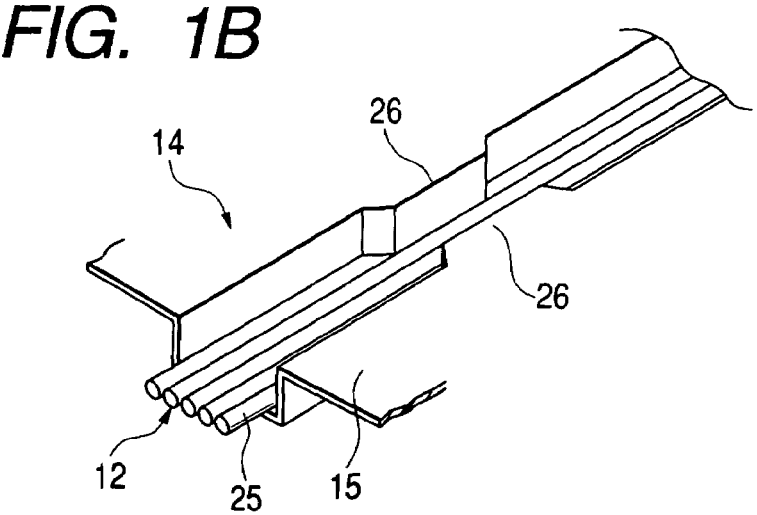
Figure 2:
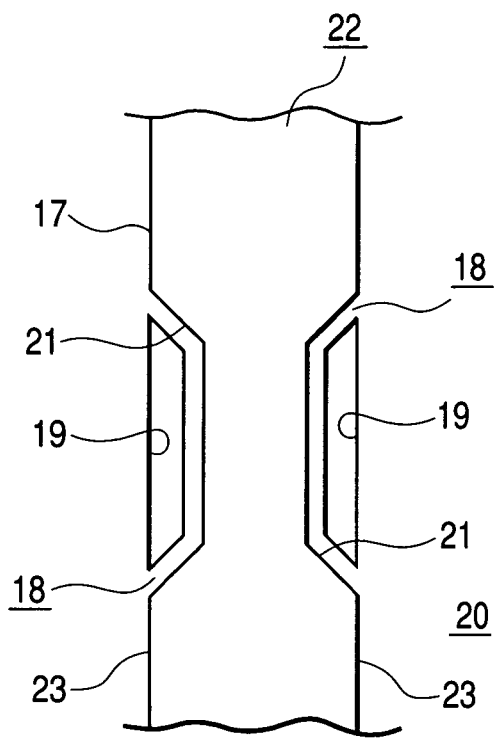
FIG. 2 is a plan view of a circuit member-installing portion of a vacuum forming mold.
Figure 3:
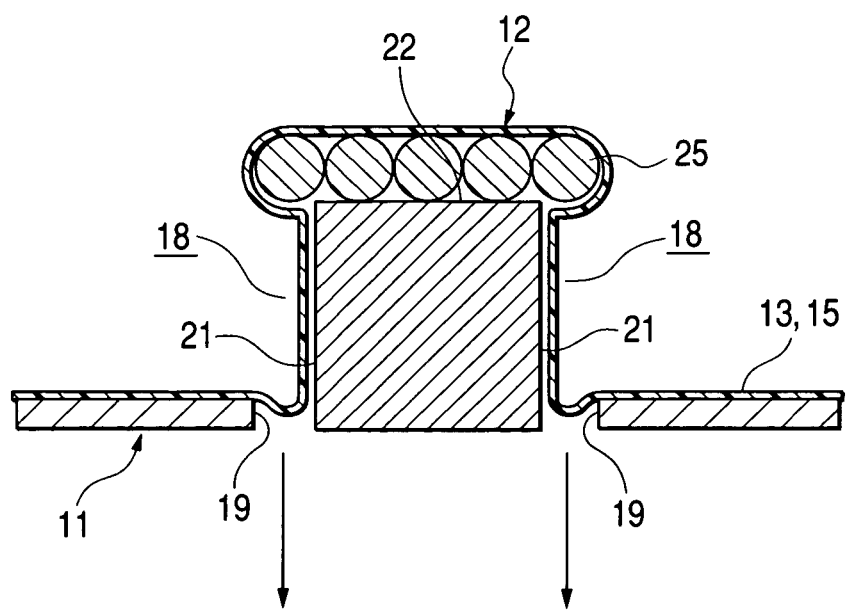
FIG. 3 is a cross-sectional view of an important portion explanatory of the method of installing the circuit member in the resin-molded panel.
Figure 4:
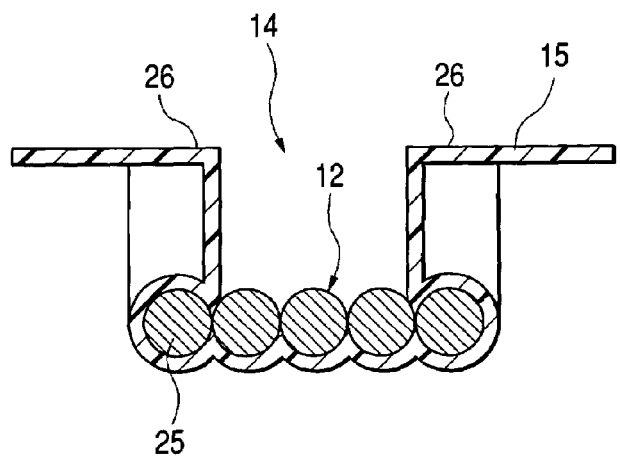
FIG. 4 is a cross-sectional view of an important portion of the circuit member-incorporating resin-molded panel.

FIG. 1A is an exploded, perspective view explanatory of a method of installing a circuit member in a resin-molded panel, and FIG. 1B is a perspective view of a circuit member-incorporating resin-molded panel. FIG. 2 is a plan view of a circuit member-installing portion of a vacuum forming mold, FIG. 3 is a cross-sectional view of an important portion explanatory of the method of installing the circuit member in the resin-molded panel, and FIG. 4 is a cross-sectional view of an important portion of the circuit member-incorporating resin-molded panel. For better understanding, part of the drawings are exaggerated or omitted. First, the construction will be described.

In FIG. 1, reference numeral 1 denotes the vacuum forming mold of the invention, reference numeral 12 the circuit member, and reference numeral 13 a panel material. Reference numeral 14 denotes the circuit member-incorporating resin-molded panel, obtained by the method of the invention for installing the circuit member in the resin-molded panel, and the vacuum forming mold 11. This circuit member-incorporating resin-molded panel 14 comprises the circuit member 12 and the resin-molded panel 15.

In FIGS. 1 to 3, the vacuum forming mold 11 comprises a base mold 16, and includes the circuit member-installing portion 17, a plurality of notch spaces 18, and a plurality of air-drawing holes 19, and this vacuum forming mold has the construction as shown in the drawings. The base mold 16 is a plate-like member having a flat front surface 20, and the circuit member-installing portion 17, having a width substantially equal to a width of the circuit member 12, and a suitable height, is formed on and projects from the front surface 20 (This height is determined by a depth of a groove in the resin-molded panel 15 in which the circuit member 12 is installed.).

The circuit member-installing portion 17 is formed along a path of installation of the circuit member 12, and has a plurality of pairs of notched portions 21. Each pair of notched portions 21 and 21 are formed by cutting an upper surface 22 and opposite side surfaces 23 and 23 of the circuit member-installing portion 17 as shown in the drawings. The pairs of notched portions 21 are provided respectively at those regions at which the circuit member 12 need to be fixed. As a result of formation of each pair of notched portions 21 and 21, the notch spaces 18 are formed in the circuit member-installing portion 17 (The notch space 18 is a space defined by the upper surface 22, the side surface 23, the front surface 20 of the base mold 16, and the notched portion 21.).

The upper surface 22 of the circuit member-installing portion 17 serves as a surface, on which the circuit member 12 is placed, and is flat. The air-drawing holes 19, communicating respectively with the notch spaces 18, are formed through the base mold 16. Each air-drawing hole 19 is formed within the notching range of the corresponding notched portion 21.

Reference numerals 24 denote other air-drawing holes than the air-drawing holes 19, and these holes 24 are formed through the base mold 16. The plurality of air-drawing holes 24 are formed respectively in suitable portions of the base mold 16.

As the circuit member 12, there is used a flat circuit member formed by integrally connecting a plurality of wires 25 together in a juxtaposed manner (The circuit member is not limited to such a flat circuit member, and may be an FPC, an FFC or a wire harness comprising a plurality of wires bundled together.)

The panel material 13 is a sheet made of a synthetic resin, a flexible sheet, or a film, and this panel material, when heated, is softened, and after the vacuum forming, this panel material is molded into the resin-molded panel 15 (The resin-molded panel 15 may be rigid or may be soft.)

Next, the method of the invention for installing the circuit member in the resin-molded panel will be described on the basis of the above construction. The method of the invention for installing the circuit member in the resin-molded panel is characterized in that through a first, a second and a third step described below, the circuit member 12 is installed in the resin-molded panel 15 simultaneously when this resin-molded panel 15 is vacuum formed.

In the first step, there is carried out an operation in which the circuit member 12 to be installed is placed on the upper surface 22 of the circuit member-installing portion 17. At this time, the circuit member 12 is placed on the upper surface 22 of the circuit member-installing portion 17 so as not to be displaced relative thereto. After the first step is finished, the operation proceeds to the second step.

In the second step, the panel material 13, beforehand heated and softened, for example, by an infrared heater or the like, is put or laid on the front surface 20 of the base mold 16. At this time, the panel material 13, thus heated and softened, is laid on the front surface 20 in a manner to cover the circuit member 12 placed on the upper surface 22 of the circuit member-installing portion 17. After the second step is finished, the operation proceeds to the third step.

In the third step, the air, residing between the panel material 13 and the front surface 20 of the base mold 16, is drawn through the plurality of notch spaces 18 and the air-drawing holes 19 and 24. At this time, that is, when the air between the panel material 13 and the front surface 20 of the base mold 16 is drawn in a direction of arrows as shown in FIG. 3, the heated and softened panel material 13 is drawn and fitted into the notch spaces 18 (The drawing of the panel material 13 can be easily effected when tapering surfaces are formed on the notched portions 21 as shown in FIG. 2), and also is brought into intimate contact with the circuit member 12 to thereby hold and fix this circuit member 12. The heated and softened panel material 13 is molded in conformity with the configuration of the circuit member 12. When the panel material 13 is sufficiently cooled, the third step is finished.

The third step is thus finished, and then when the vacuum forming mold 11 is withdrawn in the above air-drawing direction, or the sufficiently-cooled panel material 13, that is, the resin-molded panel 15, is pushed out in a direction opposite to the above air-drawing direction, the circuit member-incorporating resin molded panel 14, as shown in FIGS. 1 and 4, is obtained.

In FIGS. 1 and 4, the circuit member 12 is fixedly held in the circuit member-incorporating resin-molded panel 14 by a plurality of retaining convex portions 26. The resin-molded panel 15 is held in intimate contact with the circuit member 12 in conformity with the configuration thereof, so that the circuit member 12 is held and fixed (As will be appreciated from FIG. 4, the lateral displacement of the circuit member 12 will not occur.). The retaining convex portions 26 are formed respectively by those portions of the heated and softened panel material 13 drawn and fitted respectively into the notch spaces 18 as described above.

As described above with reference to FIGS. 1 to 4, the circuit member 12 can be installed in the resin-molded panel 15 simultaneously when this resin-molded panel 15 is vacuum formed. And besides, as will be appreciated from the observation of the resin-molded panel 15, undercut portions can be eliminated. Therefore, the productivity and the operation efficiency can be enhanced as compared with the conventional construction. Furthermore, as compared with the conventional construction, the fixed condition of the circuit member 12 can be enhanced by holding the resin-molded panel 15 in intimate contact with the circuit member 12. In addition, the need for fastening members such as clamps is obviated, so that the increase of the cost can be suppressed.

Figure 5:
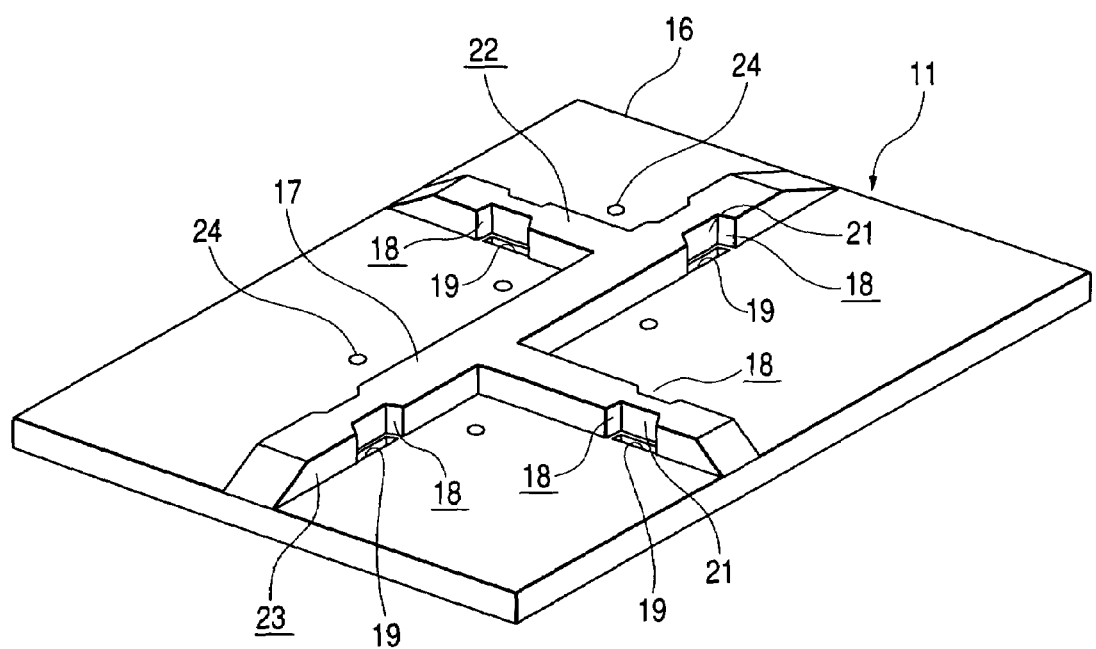
FIG. 5 is a perspective view showing another example of a vacuum forming mold.

FIG. 5 is a perspective view showing another example of a vacuum forming mold. A circuit member-installing portion 17 of the vacuum forming mold 11 of FIG. 5 is formed in conformity with a path of installation of a circuit member (not shown) having branching circuits (The basic construction of this vacuum forming mold is the same as that of the above-mentioned vacuum forming mold 11, and therefore identical reference numerals are used, and detail description thereof will be omitted.).

Figure 6A:
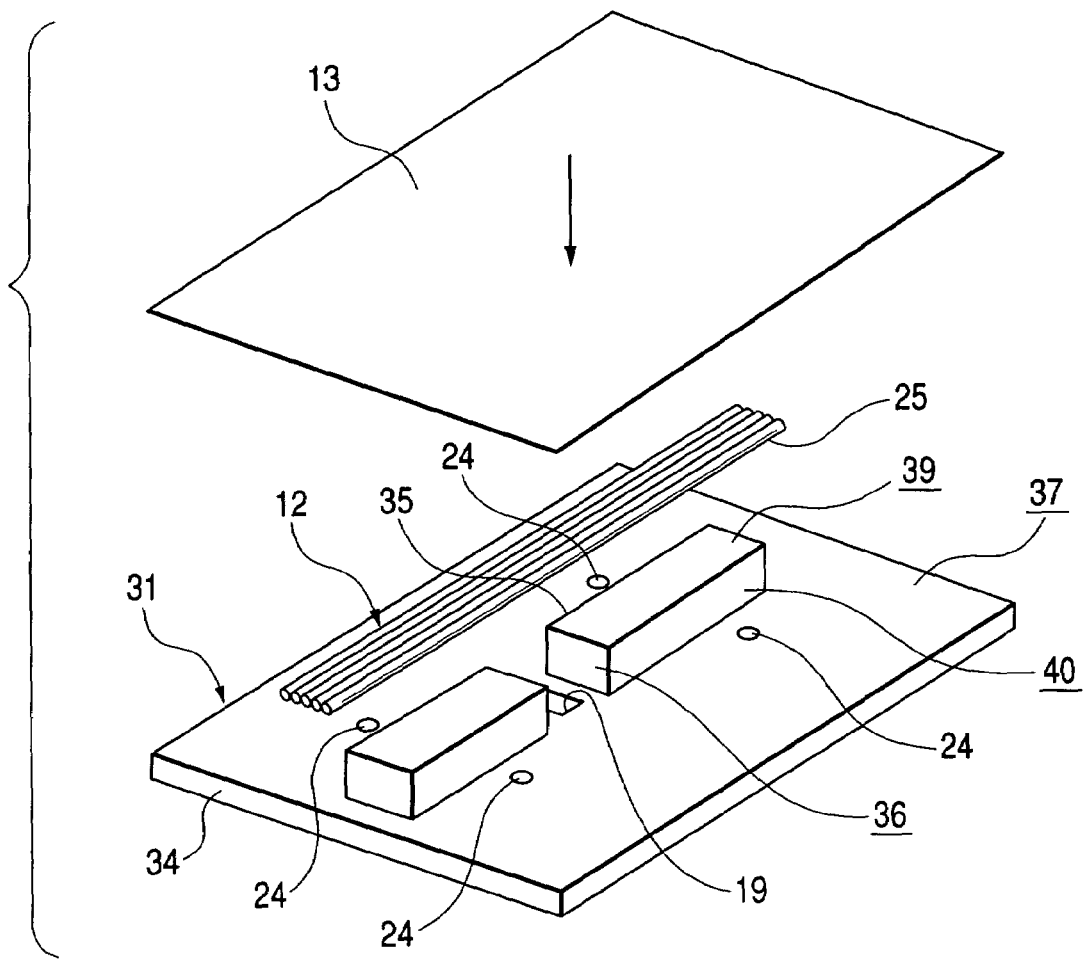
FIGS. 6A and 6B are views showing another preferred embodiment of the invention.
Figure 6B:
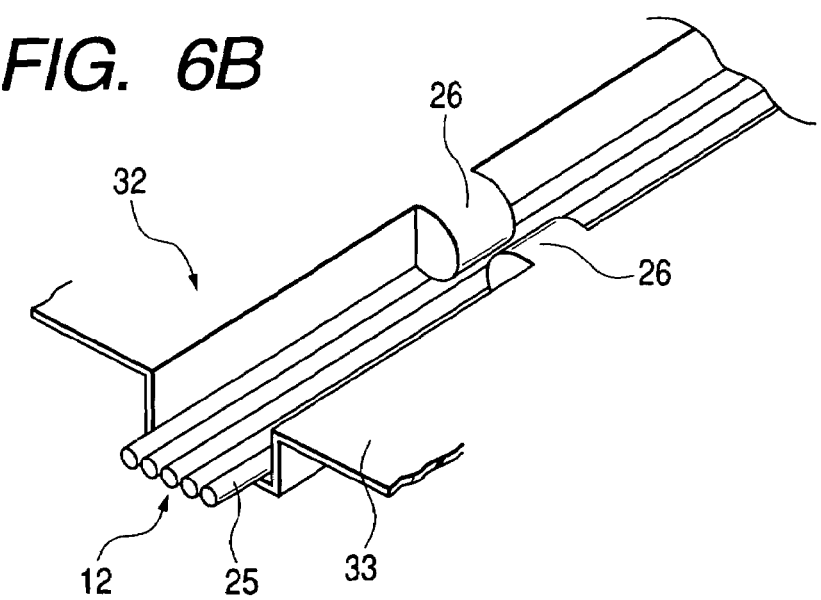

Next, another embodiment of the invention will be described with reference to FIGS. 6 to 8. FIG. 6A is an exploded, perspective view explanatory of a method of installing a circuit member in a resin-molded panel, and FIG. 6B is a perspective view of a circuit member-incorporating resin-molded panel. FIG. 7 is a plan view of a circuit member-installing portion of a vacuum forming mold, and FIG. 8 is a side-elevational view explanatory of the method of installing the circuit member in the resin-molded panel. For better understanding, part of the drawings are exaggerated or omitted.

First, the construction will be described (Those portions, basically identical in construction to those of the above embodiment, will be designated by identical reference numerals, respectively, and detailed description thereof will be omitted.).

In FIG. 6, reference numeral 31 denotes the vacuum forming mold of the invention, and reference numeral 32 denotes the circuit member-incorporating resin-molded panel, obtained by the method of the invention for installing the circuit member in the resin-molded panel, and the vacuum forming mold 31. This circuit member-incorporating resin-molded panel 32 comprises the circuit member 12 and the resin-molded panel 33.

In FIGS. 6 to 8, the vacuum forming mold 31 comprises a base mold 34, and includes the circuit member-installing portion 35, a notch space 36, and a plurality of air-drawing holes 19 and 24, and this vacuum forming mold has the construction as shown in the drawings. The base mold 34 is a plate-like member having a flat front surface 37, and the circuit member-installing portion 35, having a width substantially equal to a width of the circuit member 12, and a suitable height, is formed on and projects from the front surface 37 (This height is determined by a depth of a groove in the resin-molded panel 33 in which the circuit member 12 is installed.).

The circuit member-installing portion 35 is formed along a path of installation of the circuit member 12, and has a notched portion 38 formed in an intermediate portion thereof where the circuit member 12 need to be fixed. The notched portion 38 is formed by cutting an upper surface 39 and opposite side surfaces 40 and 40 of the circuit member-installing portion 35 as shown in the drawings (This notched portion is formed to interrupt the circuit member-installing portion 35. The notched portion 38 may have tapering surfaces continuous with the side surfaces 40 and 40.). As a result of formation of the notched portion 38, the notch space 36 is formed in the circuit member-installing portion 35 in a manner to interrupt this circuit member-installing portion.

The upper surface 39 of the circuit member-installing portion 35 serves as a surface, on which the circuit member 12 is placed, and is flat. The air-drawing hole 19, communicating with the notch space 36, is formed through the base mold 34. The air-drawing hole 19 is formed within the notching range of the notched portion 38.

Next, the method of the invention for installing the circuit member in the resin-molded panel will be described on the basis of the above construction. The method of the invention for installing the circuit member in the resin-molded panel is characterized in that through a first, a second and a third step described below, the circuit member 12 is installed in the resin-molded panel 33 simultaneously when this resin-molded panel 33 is vacuum formed.

In the first step, there is carried out an operation in which the circuit member 12 to be installed is placed on the upper surface 39 of the circuit member-installing portion 35. At this time, the circuit member 12 is placed on the upper surface 39 of the circuit member-installing portion 35 so as not to be displaced relative thereto (see FIGS. 6 and 8). After the first step is finished, the operation proceeds to the second step.

In the second step, a panel material 13, beforehand heated and softened, for example, by an infrared heater or the like, is put or laid on the front surface 37 of the base mold 34. At this time, the panel material 13, thus heated and softened, is laid on the front surface in a manner to cover the circuit member 12 placed on the upper surface 39 of the circuit member-installing portion 35. After the second step is finished, the operation proceeds to the third step.

In the third step, the air, residing between the panel material 13 and the front surface 37 of the base mold 34, is drawn through the notch space 36 and the air-drawing holes 19 and 24. At this time, that is, when the air between the panel material 13 and the front surface 37 of the base mold 34 is drawn, the heated and softened panel material 13 is drawn and fitted into the notch space 36, and also is brought into intimate contact with the circuit member 12 to thereby hold and fix this circuit member 12 (The air may be drawn until those opposed portions of the panel material 13, drawn into the notch space 36, are brought into intimate contact with each other at their distal ends as will be described in an example described later.). The heated and softened panel material 13 is molded in conformity with the configuration of the circuit member 12. When the panel material 13 is sufficiently cooled, the third step is finished.

The third step is thus finished, and then when the vacuum forming mold 31 is withdrawn in the air-drawing direction, or the sufficiently-cooled panel material 13, that is, the resin-molded panel 33, is pushed out in a direction opposite to the air-drawing direction, the circuit member-incorporating resin molded panel 32, as shown in FIG. 6, is obtained.

In FIG. 6, the circuit member 12 is fixedly held in the circuit member-incorporating resin-molded panel 32 by a pair of retaining convex portions 26 and 26. The resin-molded panel 33 is held in intimate contact with the circuit member 12 in conformity with the configuration thereof, so that the circuit member 12 is held and fixed. The pair of retaining convex portions 26 and 26 are formed respectively by those portions of the heated and softened panel material 13 drawn and fitted into the notch space 36 as described above.

As described above with reference to FIGS. 6 to 8, the circuit member 12 can be installed in the resin-molded panel 33 simultaneously when this resin-molded panel 33 is vacuum formed. And besides, as will be appreciated from the observation of the resin-molded panel 33, undercut portions can be eliminated. Therefore, the productivity and the operation efficiency can be enhanced as compared with the conventional construction. Furthermore, as compared with the conventional construction, the fixed condition of the circuit member 12 can be enhanced by holding the resin-molded panel 33 in intimate contact with the circuit member 12. In addition, the need for fastening members such as clamps is obviated, so that the increase of the cost can be suppressed.

Figure 9A:
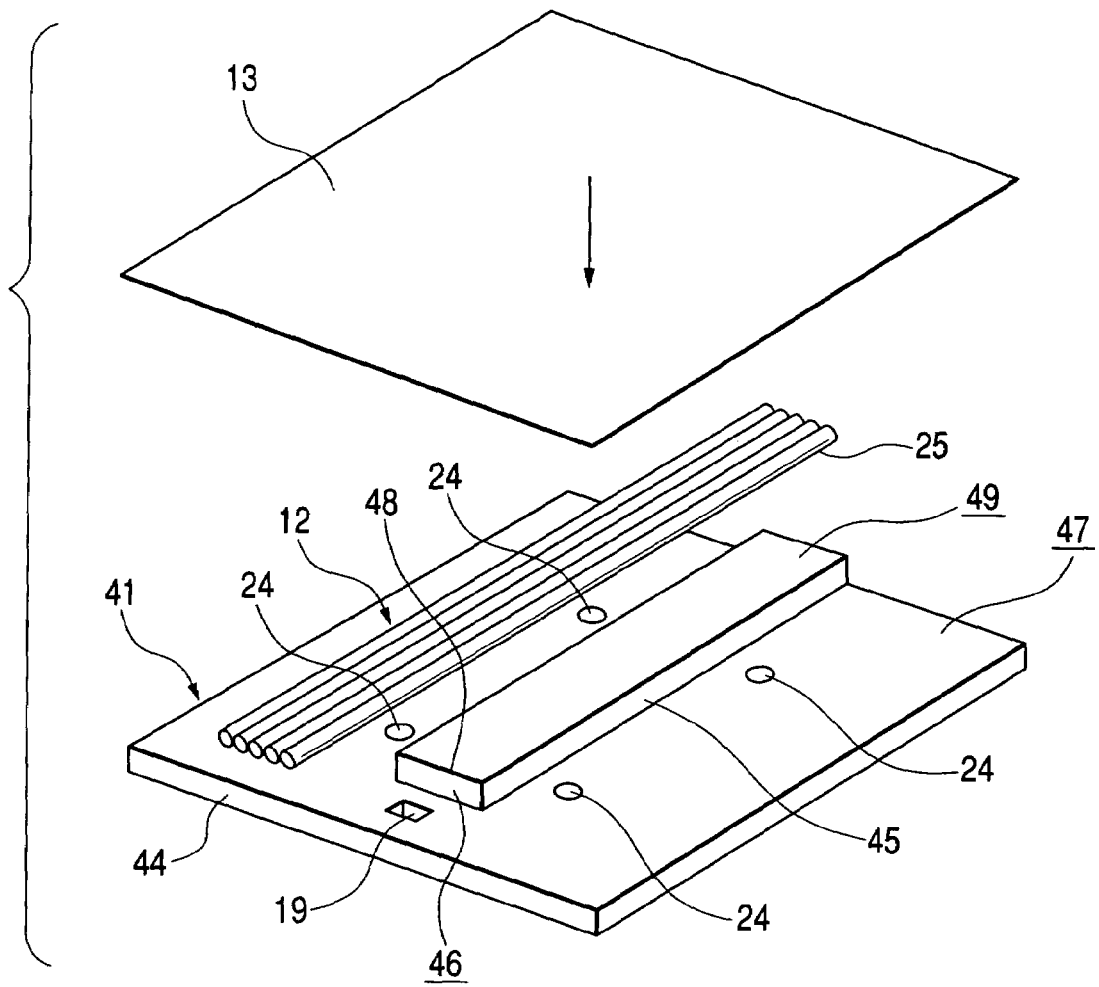
FIGS. 9A and 9B are views showing a further embodiment.
Figure 9B:
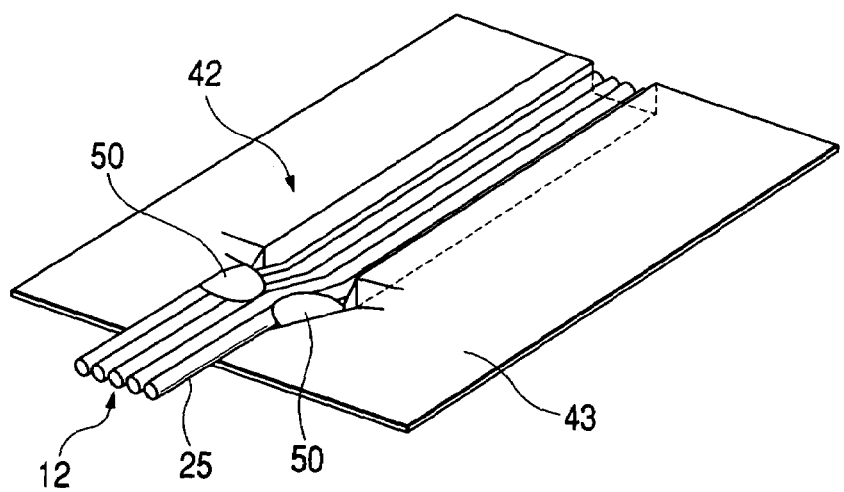
Figure 10:
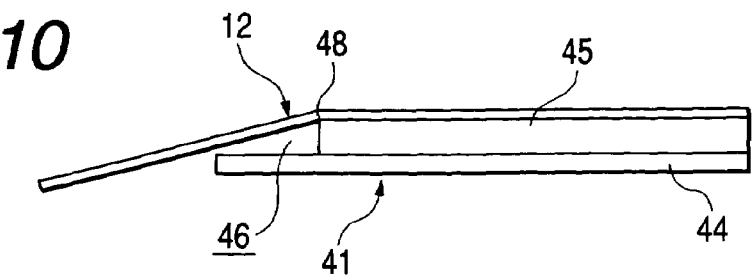
FIG. 10 is a side-elevational view explanatory of the method of installing the circuit member in the resin-molded panel.

Next, a further embodiment of the invention will be described with reference to FIGS. 9 and 10. FIG. 9A is an exploded, perspective view explanatory of a method of installing a circuit member in a resin-molded panel, and FIG. 9B is a perspective view of a circuit member-incorporating resin-molded panel. FIG. 10 is a side-elevational view explanatory of the method of installing the circuit member in the resin-molded panel. For better understanding, part of the drawings are exaggerated or omitted.

First, the construction will be described (Those portions, basically identical in construction to those of the above embodiments, will be designated by identical reference numerals, respectively, and detailed description thereof will be omitted.).

In FIG. 9, reference numeral 41 denotes a vacuum forming mold of the invention, and reference numeral 42 denotes the circuit member-incorporating resin-molded panel, obtained by the method of the invention for installing the circuit member in the resin-molded panel, and the vacuum forming mold 41. This circuit member-incorporating resin-molded panel 42 comprises the circuit member 12 and the resin-molded panel 43.

In FIGS. 9 and 10, the vacuum forming mold 41 comprises a base mold 44, and includes a circuit member-installing portion 45, a step space 46, and a plurality of air-drawing holes 19 and 24, and this vacuum forming mold has the construction as shown in the drawings. The base mold 44 is a plate-like member having a flat front surface 47, and the circuit member-installing portion 45, having a width substantially equal to a width of the circuit member 12, and a suitable height, is formed on and projects from the front surface 47 (This height is determined by a depth of a groove in the resin-molded panel 43 in which the circuit member 12 is installed.).

The circuit member-installing portion 45 is formed along a path of installation of the circuit member 12, and a notched portion 38 formed in an intermediate portion thereof where the circuit member 12 need to be fixed. The step space 46 is formed at a step portion between an axial end 48 of the circuit member-installing portion 45 relative to the front surface 47 of the base mold 44. An upper surface 49 of the circuit member-installing portion 45 serves as a surface, on which the circuit member 12 is placed, and is flat. The air-drawing hole 19, communicating with the step space 46, is formed through the base mold 44. The air-drawing hole 19 is formed within the notching range of the notched portion 38.

Next, the method of the invention for installing the circuit member in the resin-molded panel will be described on the basis of the above construction. The method of the invention for installing the circuit member in the resin-molded panel is characterized in that through a first, a second and a third step described below, the circuit member 12 is installed in the resin-molded panel 43 simultaneously when this resin-molded panel 43 is vacuum formed.

In the first step, there is carried out an operation in which the circuit member 12 to be installed is placed on the upper surface 49 of the circuit member-installing portion 45. At this time, the circuit member 12 is placed on the upper surface 49 of the circuit member-installing portion 45 so as not to be displaced relative thereto. In this embodiment, the circuit member 12 is placed on this upper surface in such a manner that one end portion of this circuit member 12 extends outwardly from the base mold 44. After the first step is finished, the operation proceeds to the second step.

In the second step, a panel material 13, beforehand heated and softened, for example, by an infrared heater or the like, is put or laid on the front surface 47 of the base mold 44. At this time, the panel material 13, thus heated and softened, is laid on the front surface in a manner to cover the circuit member 12 (except that portion of this circuit member 12 extending outwardly from the base mold) placed on the upper surface 49 of the circuit member-installing portion 45. After the second step is finished, the operation proceeds to the third step.

In the third step, the air, residing between the panel material 13 and the front surface 47 of the base mold 44, is drawn through the step space 46 and the air-drawing holes 19 and 24. At this time, that is, when the air between the panel material 13 and the front surface 47 of the base mold 44 is drawn, the heated and softened panel material 13 is drawn and fitted into the step space 46, and also is brought into intimate contact with the circuit member 12 to thereby hold and fix this circuit member 12. The heated and softened panel material 13 is molded in conformity with the configuration of the circuit member 12. When the panel material 13 is sufficiently cooled, the third step is finished.

The third step is thus finished, and then when the vacuum forming mold 41 is withdrawn in the air-drawing direction, or the sufficiently-cooled panel material 13, that is, the resin-molded panel 43, is pushed out in a direction opposite to the air-drawing direction, the circuit member-incorporating resin molded panel 42, as shown in FIG. 9, is obtained.

In FIG. 9, the circuit member 12 is fixedly held in the circuit member-incorporating resin-molded panel 42 by a pair of retaining convex portions 50 and 50. The resin-molded panel 43 is held in intimate contact with the circuit member 12 in conformity with the configuration thereof, so that the circuit member 12 is held and fixed. The retaining convex portions 50 and 50 are formed respectively by those portions of the heated and softened panel material 13 drawn and fitted into the step space 46 as described above. The pair of retaining convex portions 50 and 50 function to effectively hold the outwardly-extending portion of the circuit member 12.

As described above with reference to FIGS. 9 and 10, the circuit member 12 can be installed in the resin-molded panel 43 simultaneously when this resin-molded panel 43 is vacuum formed. And besides, as will be appreciated from the observation of the resin-molded panel 43, undercut portions can be eliminated. Therefore, the productivity and the operation efficiency can be enhanced as compared with the conventional construction. Furthermore, as compared with the conventional construction, the fixed condition of the circuit member 12 can be enhanced by holding the resin-molded panel 43 in intimate contact with the circuit member 12. In addition, the need for fastening members such as clamps is obviated, so that the increase of the cost can be suppressed.

Figure 11A:
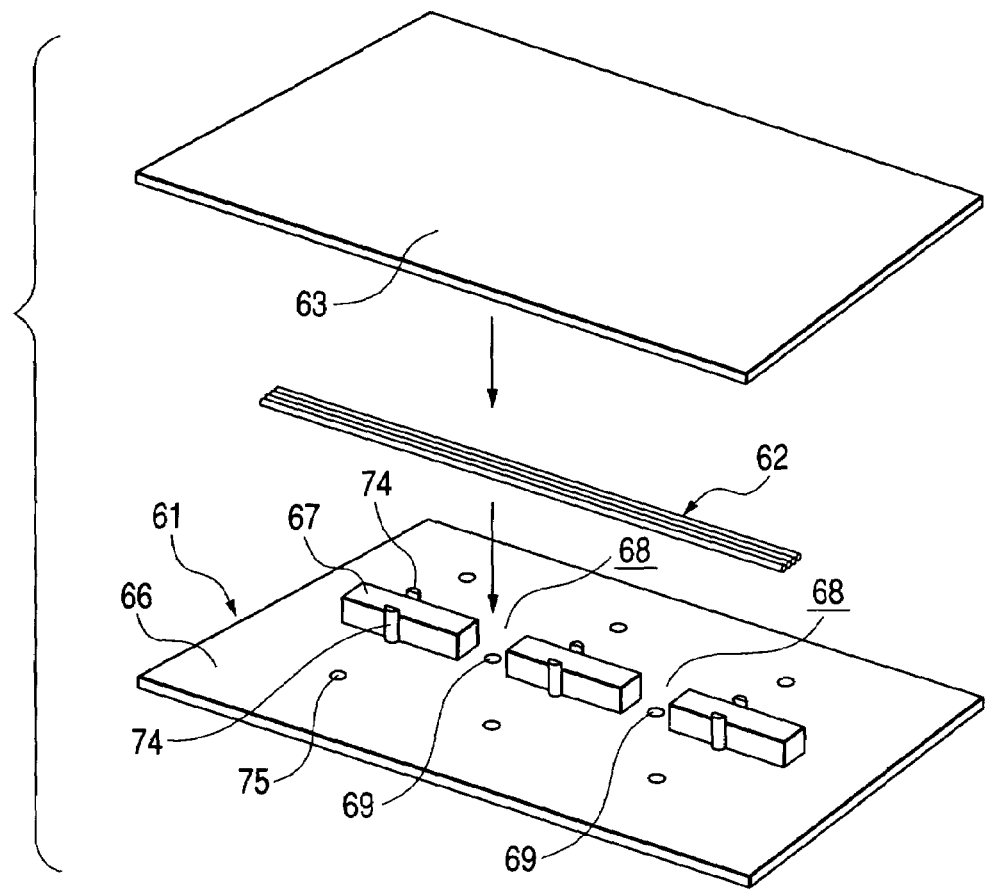
FIGS. 11A and 11B are views showing a further embodiment of the invention.
Figure 11B:
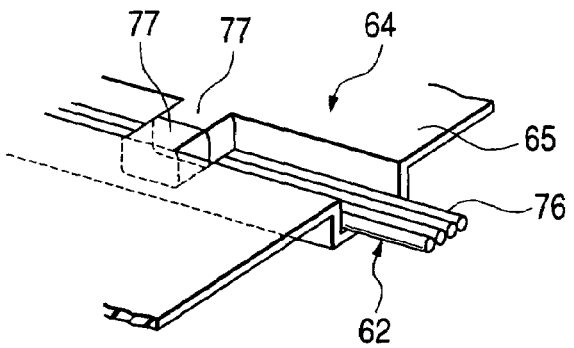
Figure 12:
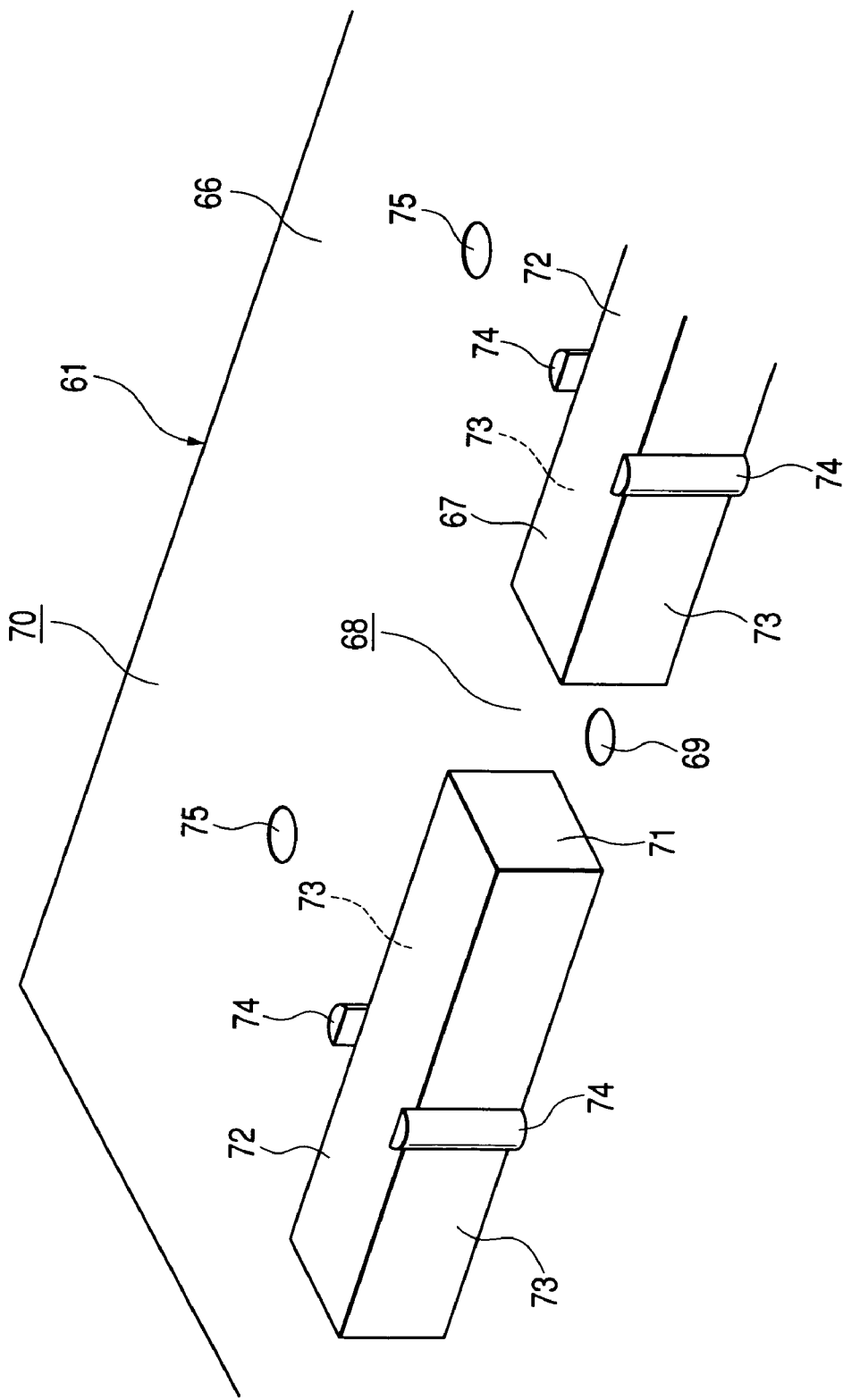
FIG. 12 is a perspective view of a circuit member-installing portion of a vacuum forming mold.
Figure 13:
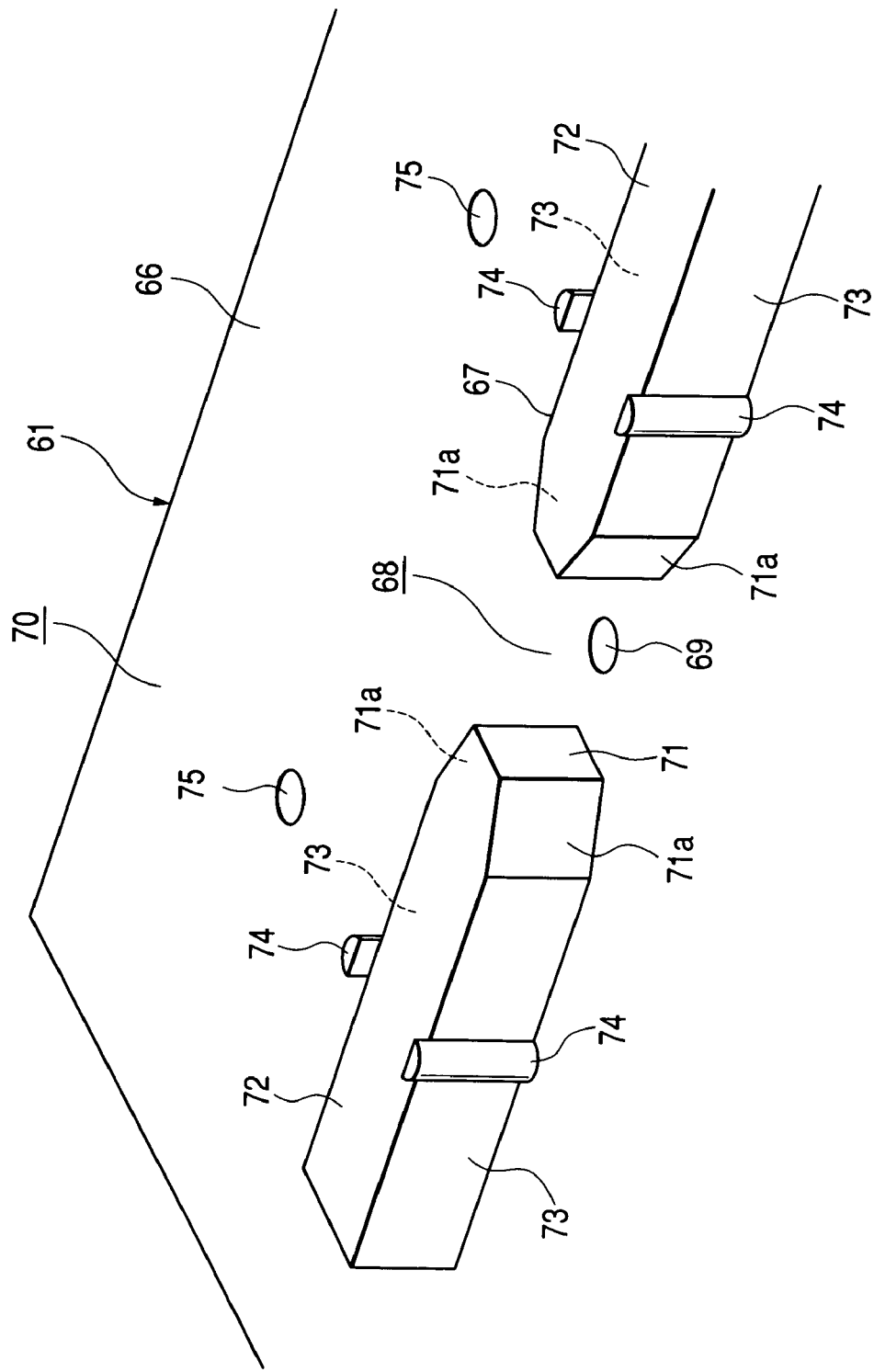
FIG. 13 is a perspective view showing another example of a circuit member-installing portion.
Figure 14A:
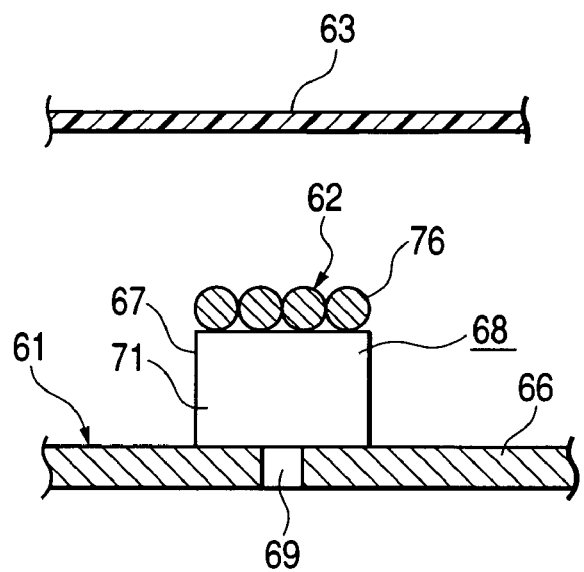
FIGS. 14A and 14B are cross-sectional views of an important portion explanatory of the method of installing the circuit member in the resin-molded panel (a first step)
Figure 14B:
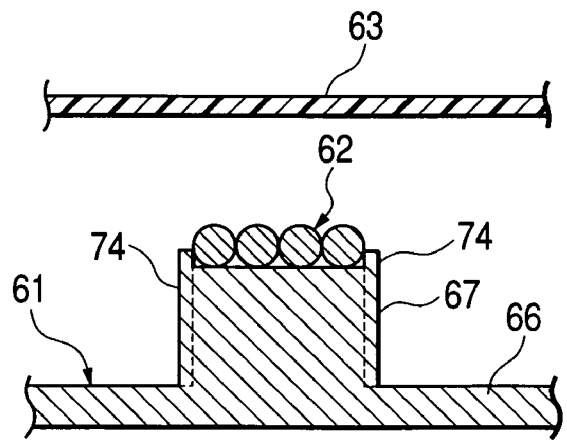
Figure 15:
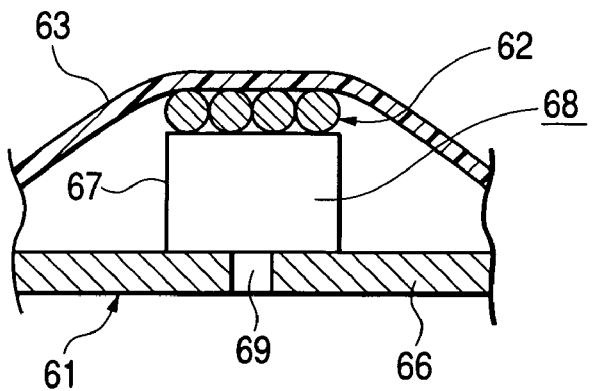
FIG. 15 is a cross-sectional view of the important portion explanatory of the method of installing the circuit member in the resin-molded panel (a second step)
Figure 16:
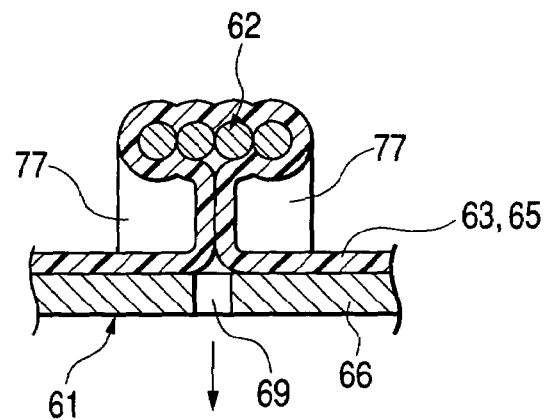
FIG. 16 is a cross-sectional view of the important portion explanatory of the method of installing the circuit member in the resin-molded panel (a third step)
Figure 17:
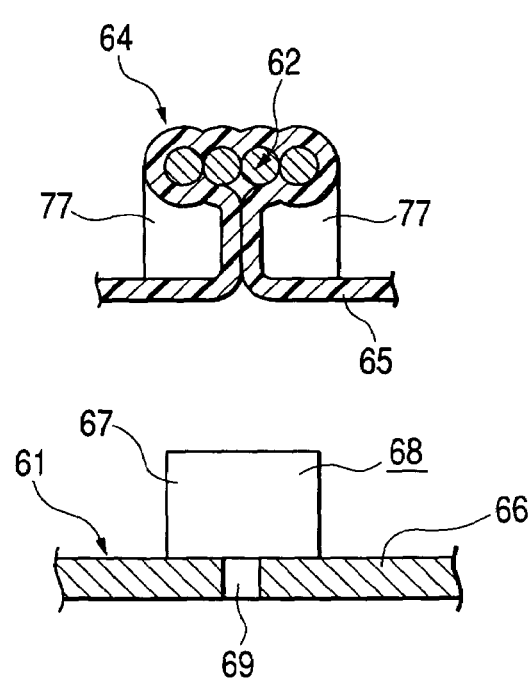
FIG. 17 is a cross-sectional view showing a condition in which the circuit member-incorporating resin-molded panel is removed from the vacuum forming mold.

Next, a further embodiment of the invention will be described with reference to FIGS. 11 to 17. FIG. 11A is an exploded, perspective view explanatory of a method of installing a circuit member in a resin-molded panel, and FIG. 11B is a perspective view of a circuit member-incorporating resin-molded panel. FIG. 12 is a perspective view of a circuit member-installing portion of a vacuum forming mold, FIG. 13 is a perspective view showing another example of a circuit member-installing portion, FIGS. 14 to 16 are cross-sectional views of an important portion explanatory of the method of installing the circuit member in the resin-molded panel (a first step), and FIG. 17 is a cross-sectional view showing a condition in which the circuit member-incorporating resin-molded panel is removed from the vacuum forming mold. For better understanding, part of the drawings are exaggerated or omitted. First, the construction will be described.

In FIG. 11, reference numeral 61 denotes the vacuum forming mold of the invention, reference numeral 62 the circuit member (flat cable), and reference numeral 63 a panel material. Reference numeral 64 denotes the circuit member-incorporating resin-molded panel, obtained by the method of the invention for installing the circuit member in the resin-molded panel, and the vacuum forming mold 61. This circuit member-incorporating resin-molded panel 64 comprises the circuit member 62 and the resin-molded panel 65.

In FIGS. 11 and 12, the vacuum forming mold 61 comprises a base mold 66, and includes the circuit member-installing portion 67, a plurality of notch spaces 68, and a plurality of air-drawing holes 69, and this vacuum forming mold has the construction as shown in the drawings. The base mold 66 is a plate-like member having a flat front surface 70, and the circuit member-installing portion 67, having a width substantially equal to a width of the circuit member 62, and a suitable height, is formed on and projects from the front surface 70 (This height is determined by a depth of a groove in the resin-molded panel 65 in which the circuit member 62 is installed.).

The circuit member-installing portion 67 is formed along a path of installation of the circuit member 62. A plurality of notched portions 71 are formed in the circuit member-installing portion 67 to interrupt it. The notched portions 71 are formed intermediate opposite ends of the circuit member-installing portion 67, and each of these notched portions 71 is formed by cutting an upper surface 72 and opposite side surfaces 73 and 73 of the circuit member-installing portion 67 as shown in the drawings. The notched portions 71 are provided respectively at those regions at which the circuit member 62 need to be fixed. Each notched portion 71 has tapering surfaces 71*a* and 71*a* continuous respectively with the side surfaces 73 and 73 (See FIG. 13. Advantageously, this facilitates the drawing of the panel material 63 into the notch space.). As a result of formation of the plurality of notched portions 71, the plurality of notch spaces 68 are formed in the circuit member-installing portion 67.

The upper surface 72 of the circuit member-installing portion 67 serves as a surface, on which the circuit member 62 is placed, and is flat. A plurality of pairs of circuit member-positioning portions 74 for positioning the circuit member 62 are formed on the opposite side surfaces 73 and 73 of the circuit member-installing portion 67. Each of the circuit member-positioning portions 74 has the shape of a half cylinder. The circuit member-positioning portions 74 extend upwardly beyond the front surface 70 of the base mold 66. Each pair of circuit member-positioning portions 74 and 74 are disposed respectively at opposite side edges of the circuit member 62, and function to prevent the circuit member 62 from being displaced out of position.

The air-drawing holes 69, communicating respectively with the notch spaces 68, are formed through the base mold 66. Each air-drawing hole 69 is formed within the notching range of the corresponding notched portion 71. Reference numerals 75 denote other air-drawing holes than the air-drawing holes 69, and these holes 75 are formed through the base mold 66. The plurality of air-drawing holes 75 are formed respectively in suitable portions of the base mold 66.

As the circuit member 62, there is used a flat cable formed by integrally connecting a plurality of wires 76 together in a juxtaposed manner (The circuit member is not limited to such a flat cable). The panel material 63 is a sheet made of a synthetic resin, a flexible sheet, or a film, and this panel material, when heated, is softened, and after the vacuum forming, this panel material is molded into the resin-molded panel 65 (The resin-molded panel 65 may be rigid or may be soft.)

Next, the method of the invention for installing the circuit member in the resin-molded panel will be described on the basis of the above construction. The method of the invention for installing the circuit member in the resin-molded panel is characterized in that through a first, a second and a third step described below, the circuit member 62 is installed in the resin-molded panel 65 simultaneously when this resin-molded panel 65 is vacuum formed.

In the first step, there is carried out an operation in which the circuit member 62 to be installed is placed on the upper surface 72 of the circuit member-installing portion 67 (see FIG. 14). At this time, the circuit member 62 is positively placed on this upper surface without displacement because of the provision of the circuit member-positioning portions 74. After the first step is finished, the operation proceeds to the second step.

In the second step, the panel material 63, beforehand heated and softened, for example, by an infrared heater or the like, is put or laid on the front surface 70 of the base mold 66 (see FIG. 15). At this time, the panel material 63, thus heated and softened, is laid on the front surface 70 in a manner to cover the circuit member 62 placed on the upper surface 72 of the circuit member-installing portion 67. After the second step is finished, the operation proceeds to the third step.

In the third step, the air, residing between the panel material 63 and the front surface 70 of the base mold 66, is drawn through the plurality of notch spaces 68 and the air-drawing holes 69 and 75. At this time, that is, when the air between the panel material 63 and the front surface 70 of the base mold 66 is drawn in a direction of an arrow (see FIG. 16), the heated and softened panel material 63 is drawn and fitted into the notch spaces 68, and also is brought into intimate contact with the circuit member 62 to thereby hold and fix this circuit member 62. The heated and softened panel material 63 is molded in conformity with the configuration of the circuit member 62.

When the air-drawing force is large, those opposed portions of the panel material 63, drawn into the notch space 68 from the opposite sides of the circuit member 62, are brought into intimate contact with each other at their distal ends (see FIG. 16. The distal ends can be fused together, depending on the softened condition of the panel material 63. The circuit member 62 is more positively held and fixed.). When the panel material 63 is sufficiently cooled, the third step is finished.

The third step is thus finished, and then when the vacuum forming mold 61 is withdrawn in the above air-drawing direction, or the sufficiently-cooled panel material 63, that is, the resin-molded panel 65, is pushed out in a direction opposite to the above air-drawing direction, the circuit member-incorporating resin molded panel 64, as shown in FIGS. 11 and 17, is obtained.

In FIGS. 11 and 17, the circuit member 62 is fixedly held in the circuit member-incorporating resin-molded panel 64 by a plurality of retaining convex portions 77. The resin-molded panel 65 is held in intimate contact with the circuit member 62 in conformity with the configuration thereof, so that the circuit member 62 is held and fixed (As will be appreciated from FIG. 17, the lateral displacement of the circuit member 62 will not occur.). The retaining convex portions 77 are formed respectively by those portions of the heated and softened panel material 63 drawn and fitted respectively into the notch spaces 68 as described above.

Figure 18:
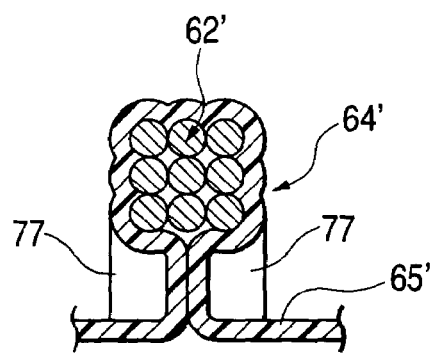
FIG. 18 is a cross-sectional view of a circuit member-incorporating resin-molded panel, using a bundle-type cable.

The circuit member 62 is the flat cable as described above, but it can be replaced by a circuit member 62' comprising a bundle-type cable. Namely, when the circuit member 62' is used, a circuit member-incorporating resin-molded panel 64' as shown in FIG. 18 is molded.

As described above with reference to FIGS. 11 to 18, the circuit member 62 (62') can be installed in the resin-molded panel 65 (65') simultaneously when this resin-molded panel 65 (65') is vacuum formed. Therefore, similar effects to those of the above embodiments can be achieved.

Figure 19:
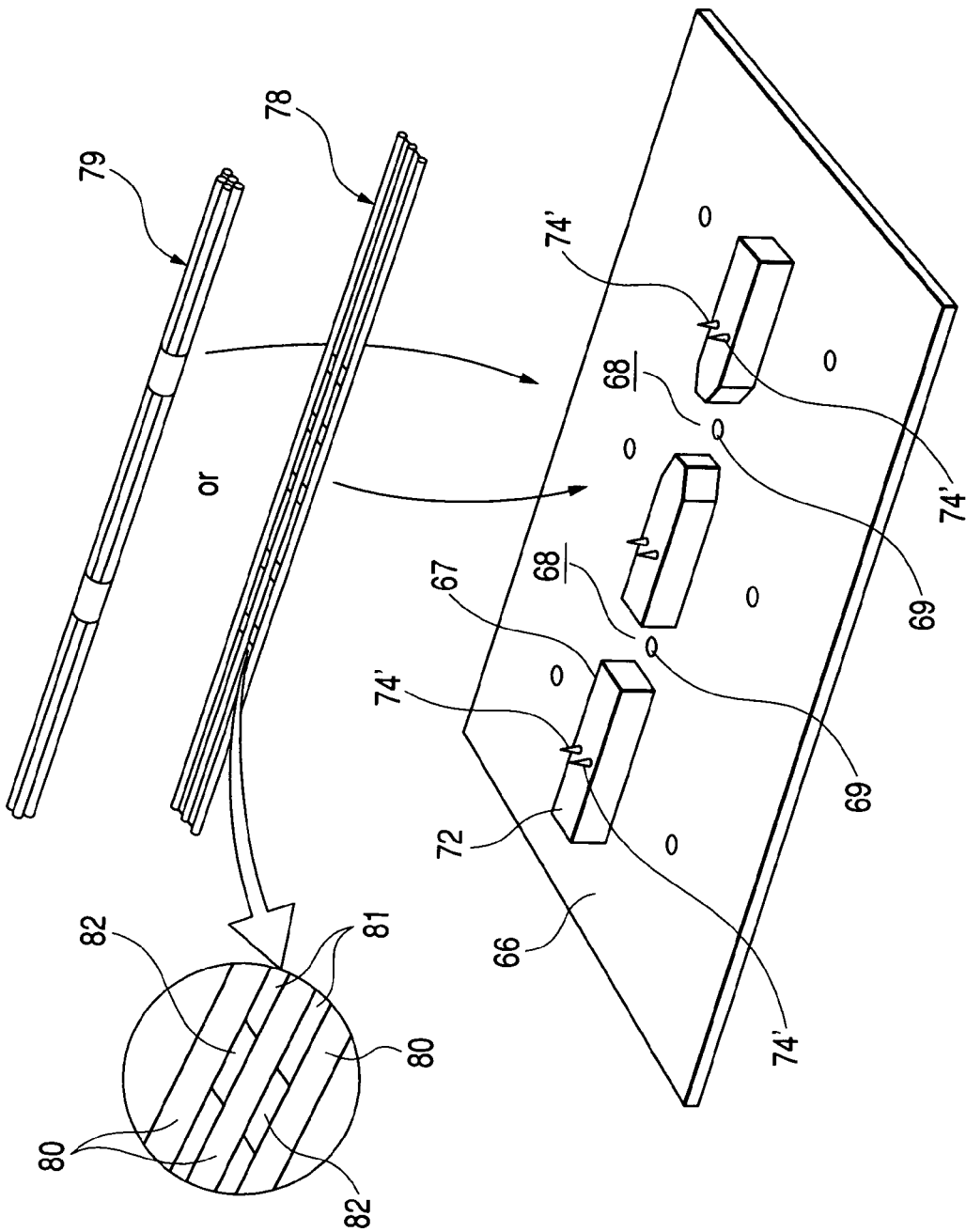
FIG. 19 is a perspective view showing another example of circuit member-positioning portions.

FIG. 19 is a perspective view showing another example of circuit member-positioning portions (Identical portions to those of the above vacuum forming mold 61 will be designated by identical reference numerals, respectively, and detailed description thereof will be omitted). In FIG. 19, a plurality of circuit member-positioning portions 74' are formed on an upper surface 72 of a circuit member-installing portion 67. The circuit member-positioning portions 74' have a pin-like shape, and each pair of circuit member-positioning portions 74' and 74' are formed in a juxtaposed manner, and are spaced a predetermined distance from each other. A circuit member 78, comprising a flat cable, or a circuit member 79, comprising a bundle-type cable, is adapted to be placed on the upper surface 72 of the circuit member-installing portion 67. The circuit member 78 have bridge portions 81 each interconnecting adjacent wires 80. Slits 82 are formed in each bridge portion 81 (The type of flat cable, having slits formed in bridge portions so as to facilitate the bending thereof, is commonly known. Here, such a flat cable can be used.).

Figure 20A:
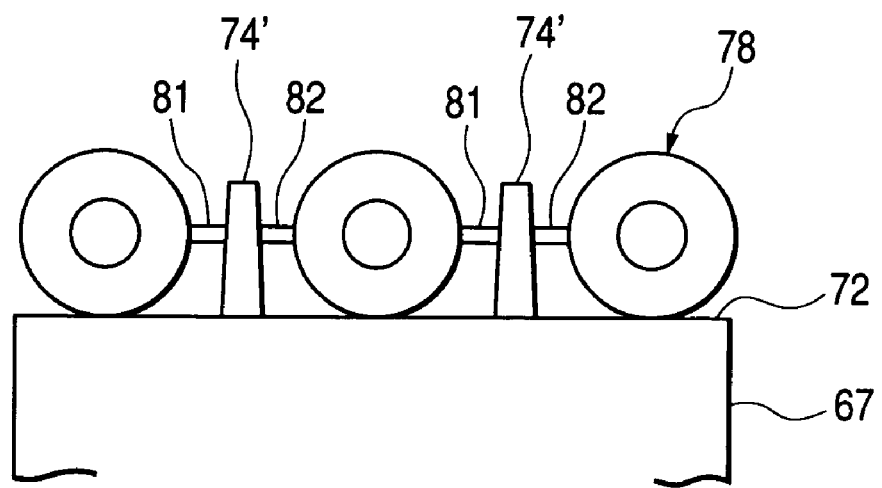
FIGS. 20A and 20B are views showing a positioned condition of the circuit member.
Figure 20B:
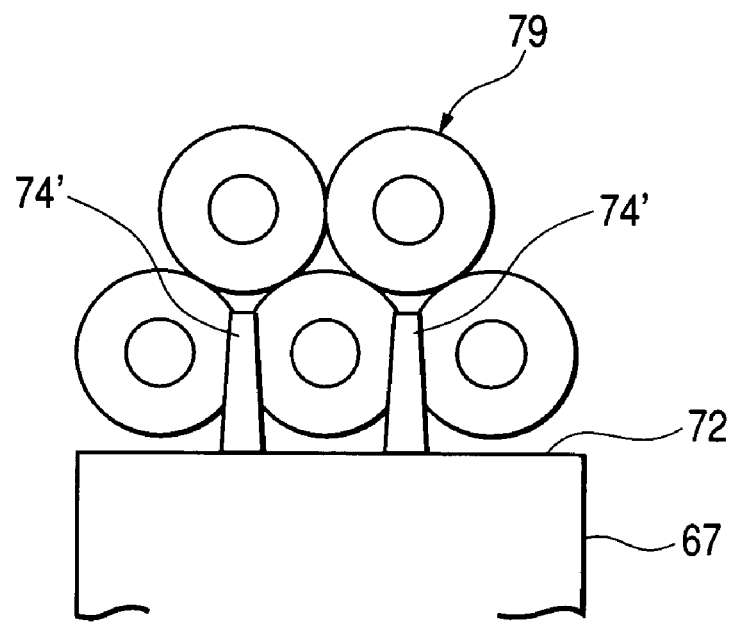

In FIG. 20, when the circuit member 78, comprising the flat cable, is placed on the upper surface 72 of the circuit member-installing portion 67, each pair of circuit member-positioning portions 74' and 74' are inserted respectively into the corresponding slits 82 and 82 to thereby position the circuit member 78. When the circuit member 79, comprising the bundle-type cable, is placed on the upper surface 72 of the circuit member-installing portion 67, each pair of circuit member-positioning portions 74' and 74' are inserted between the wires to thereby position the circuit member 79.

Figure 21A:
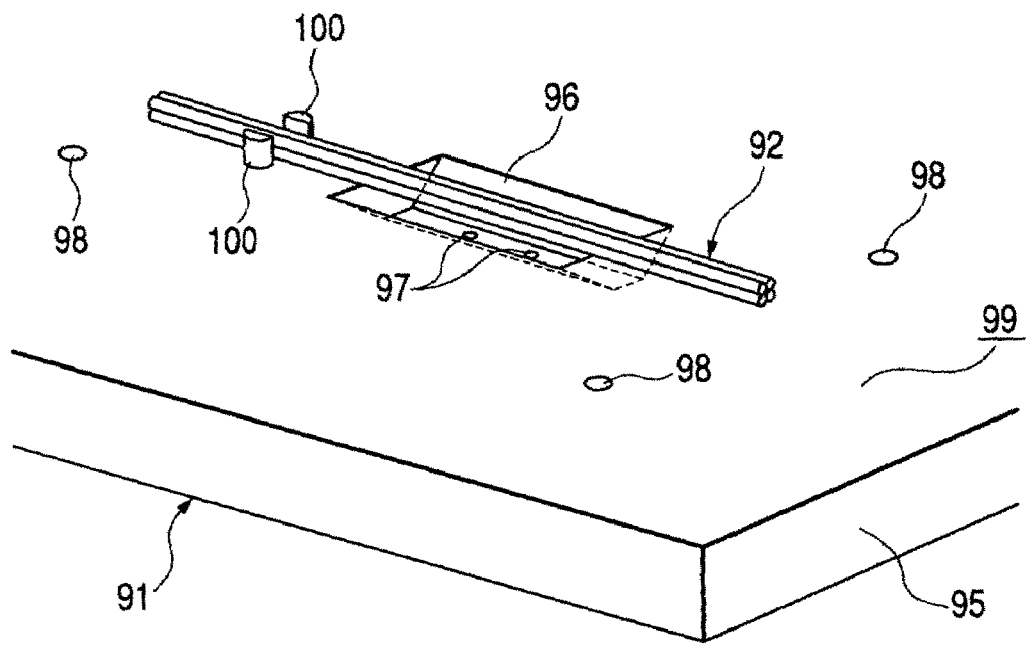
FIGS. 21A and 21B are views showing a further embodiment of a vacuum forming mold.
Figure 21B:
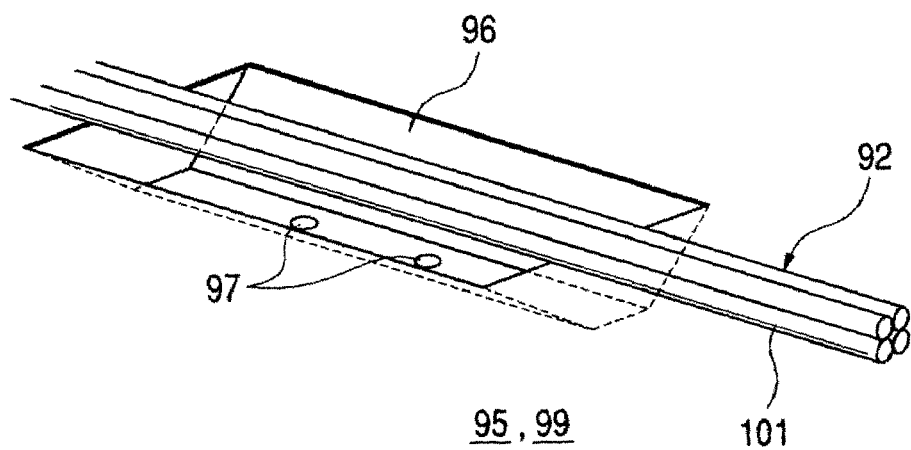
Figure 22:
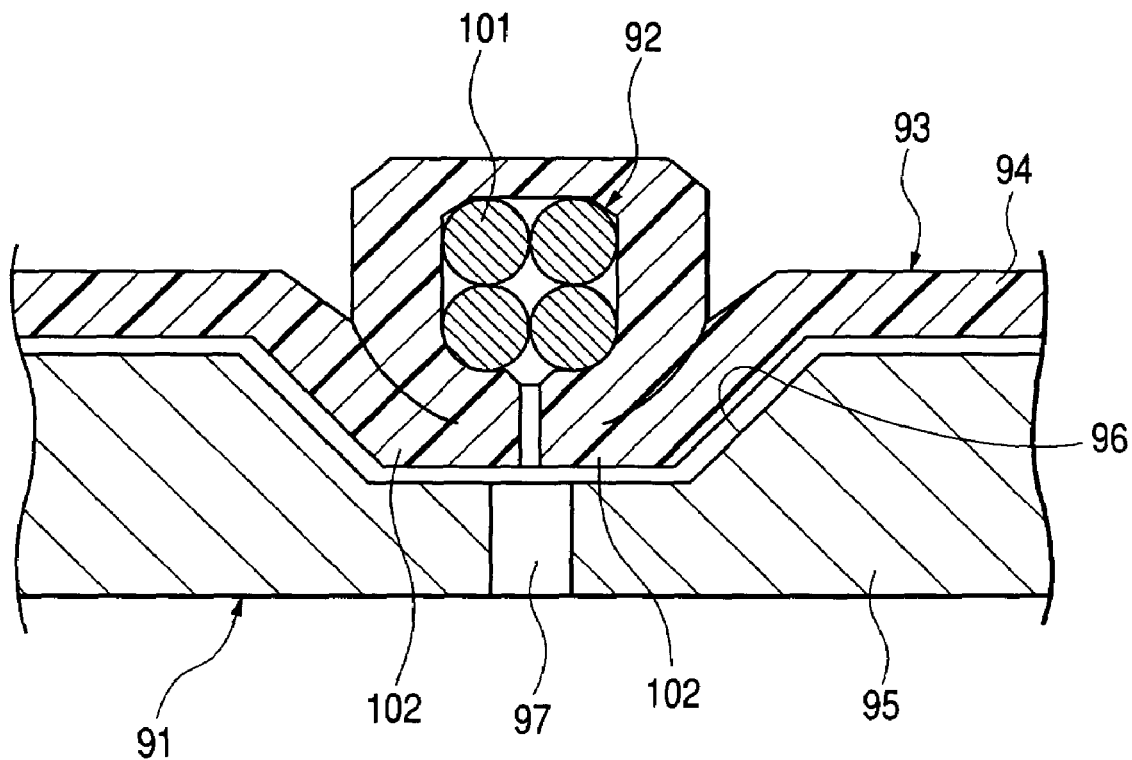
FIG. 22 is a cross-sectional view of a circuit member-incorporating resin-molded panel formed by the use of the vacuum forming mold of FIG. 21.

Next, a further embodiment of a vacuum forming mold of the invention will be described with reference to FIGS. 21 and 22. FIG. 21 shows the vacuum forming mold of this embodiment, and FIG. 21A is a perspective view, and FIG. 21B is an enlarged perspective view of an important portion. FIG. 22 is a cross-sectional view of a circuit member-incorporating resin-molded panel formed by the use of the vacuum forming mold of FIG. 21. For better understanding, part of the drawings are exaggerated or omitted. First, the construction will be described.

In FIGS. 21 and 22, reference numeral 91 denotes the vacuum forming mold of the invention, and reference numeral 92 denotes a circuit member (bundled cable). Reference numeral 93 denotes the circuit member-incorporating resin-molded panel, obtained by a method of the invention for installing the circuit member in the resin-molded panel, and the vacuum forming mold 91. This circuit member-incorporating resin-molded panel 93 comprises the circuit member 92 and the resin-molded panel 94. The resin-molded panel 94 is molded, using a panel material (not shown) as described above.

The vacuum forming mold 91 comprises a base mold 95, and includes one or more recesses 96, and a plurality of air-drawing holes 97 and 98, and this vacuum forming mold has the construction as shown in the drawings. The base mold 95 is a plate-like member having a flat front surface 99, and the circuit member 92 can be placed on the base mold 95. The recess 96, having a width larger than a width of the circuit member 92, and a suitable depth, is formed in the front surface 99 of the base mold 95. A plurality of pairs of circuit member-positioning portions 100 and 100 for positioning the circuit member 92 are formed on the front surface 99.

The recess 96 is formed along a path of installation of the circuit member 92, and the recess 96 is formed at that region where the circuit member 92 need to be fixed. Each of the circuit member-positioning portions 100 has the shape of a half cylinder. The pair of circuit member-positioning portions 100 and 100 extend upwardly from the front surface 99 of the base mold 95. The pair of circuit member-positioning portions 100 and 100 are disposed respectively at opposite side edges of the circuit member 92, and function to prevent the circuit member 92 from being displaced out of position. The pair of circuit member-positioning portions 100 and 100 may be so arranged and formed as to be inserted into the circuit member 92.

The air-drawing holes 97, communicating with the recess 96, are formed through the base mold 95. The air-drawing holes 97 are formed in a bottom surface of the recess 96. The plurality of air-drawing holes 98 other than the air-drawing holes 97 (which have the same function, but are distinguished from the air-drawing holes 98 with respect to the arrangement) are formed respectively in suitable portions of the base mold 95.

A bundle-type cable, comprising a plurality of wires 101 bundled together, is used as the circuit member 92 (The circuit member is not limited to such a type.). The panel material (not shown) is a sheet made of a synthetic resin, a flexible sheet, or a film, and this panel material, when heated, is softened, and after the vacuum forming, this panel material is molded into the resin-molded panel 94 (The resin-molded panel 94 maybe rigid or may be soft.)

Next, the method of the invention for installing the circuit member in the resin-molded panel will be described on the basis of the above construction. The method of the invention for installing the circuit member in the resin-molded panel is characterized in that through a first, a second and a third step described below, the circuit member 92 is installed in the resin-molded panel 94 simultaneously when this resin-molded panel 94 is vacuum formed.

In the first step, there is carried out an operation in which the circuit member 92 to be installed is placed on the upper surface 99 of the base mold 95 along the installation path. At this time, the circuit member 92 is installed astride the recess 96. Also, the circuit member 92 is positively placed on this upper surface without displacement because of the provision of the circuit member-positioning portions 100. After the first step is finished, the operation proceeds to the second step.

In the second step, the panel material (not shown), beforehand heated and softened, for example, by an infrared heater or the like, is put or laid on the front surface 99 of the base mold 95. At this time, the panel material, thus heated and softened, is laid on the front surface 99 in a manner to cover the circuit member 92 placed on the front surface 99 of the base mold 95. After the second step is finished, the operation proceeds to the third step.

In the third step, the air, residing between the panel material and the front surface 99 of the base mold 95, is drawn through the recess 96 and the air-drawing holes 97 and 98. At this time, that is, when the air between the panel material and the front surface 99 of the base mold 95 is drawn, the heated and softened panel material is drawn and fitted into a recess space, defined by the recess 96, and also is brought into intimate contact with the circuit member 92 to thereby hold and fix this circuit member 92. The heated and softened panel material is molded in conformity with the configuration of the circuit member 92.

The third step is thus finished, and then when the vacuum forming mold 91 is withdrawn in the air-drawing direction, or the sufficiently-cooled panel material, that is, the resin-molded panel 94, is pushed out in a direction opposite to the air-drawing direction, the circuit member-incorporating resin-molded panel 93, having a cross-sectional shape as shown in FIG. 22, is obtained.

In FIG. 22, the circuit member 92 is fixedly held in the circuit member-incorporating resin-molded panel 93 by retaining convex portions 102 and 102. The resin-molded panel 94 is held in intimate contact with the circuit member 92 in conformity with the configuration thereof, so that the circuit member 92 is held and fixed (The lateral displacement thereof will not occur.). The retaining convex portions 102 and 102 are formed respectively by those portions of the heated and softened panel material drawn and fitted respectively into the recess space as described above.

As described above with reference to FIGS. 21 and 22, the circuit member 92 can be installed in the resin-molded panel 94 simultaneously when this resin-molded panel 94 is vacuum formed. Therefore, similar effects to those of the above embodiments can be achieved.

Figure 23A:
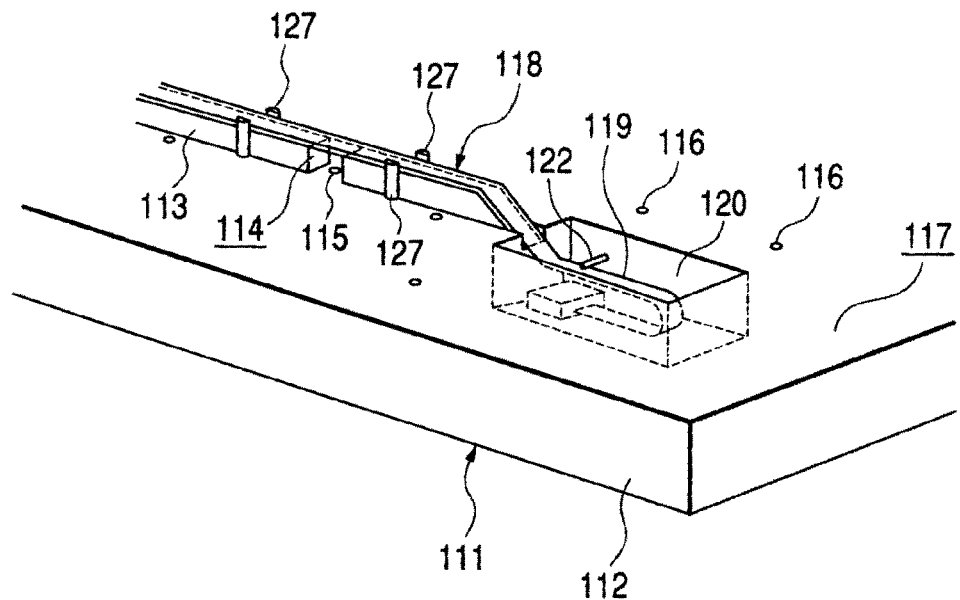
FIGS. 23A and 23B are views showing a further embodiment of a vacuum forming mold.
Figure 23B:
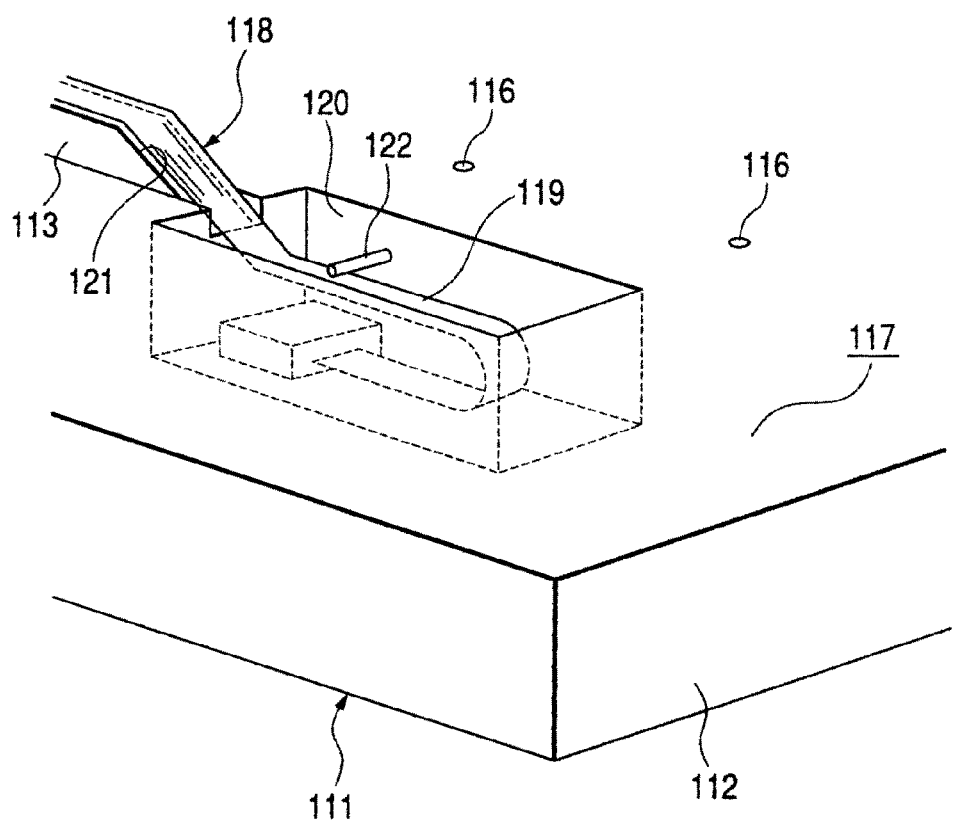
Figure 24A:
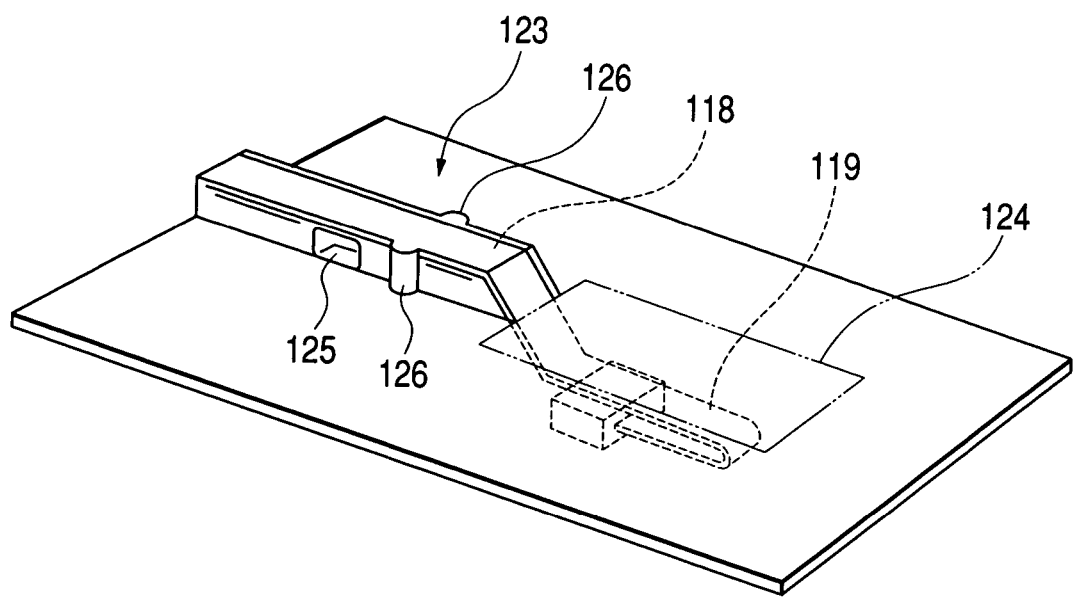
FIGS. 24A and 24B are views showing a circuit member-incorporating resin-molded panel formed by the use of the vacuum forming mold of FIG. 23.
Figure 24B:
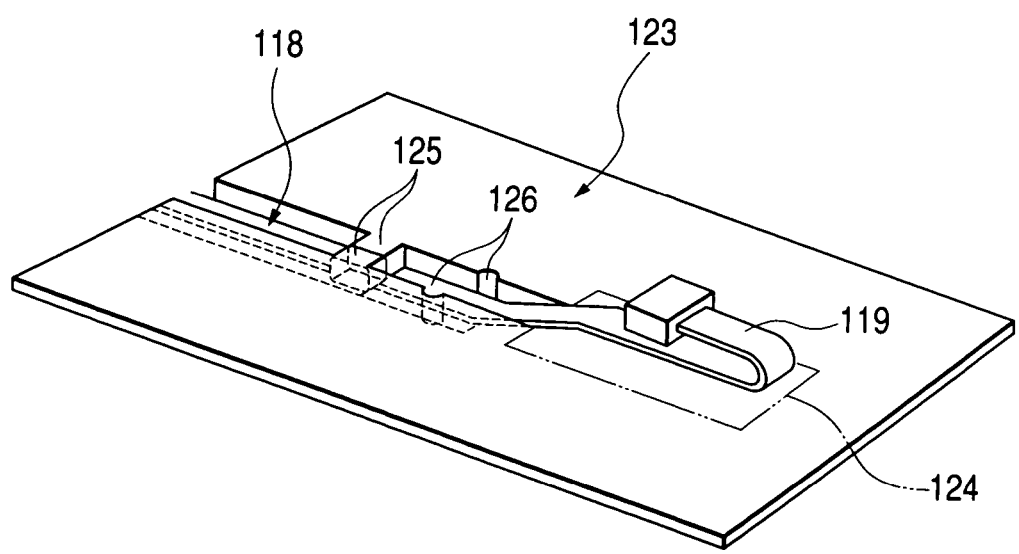

Next, a further embodiment of a vacuum forming mold of the invention will be described with reference to FIGS. 23 and 24. FIG. 23 shows the vacuum forming mold of this embodiment, and FIG. 23A is a perspective view, and FIG. 23B is an enlarged perspective view of an important portion. FIG. 24 shows a circuit member-incorporating resin-molded panel formed by the use of the vacuum forming mold of FIG. 23, and FIG. 24A is a perspective view showing its reverse side, and FIG. 24B is a perspective view showing its front side.

In FIG. 23, the vacuum forming mold 111 comprises a base mold 112, and includes a circuit member-installing portion 113, a plurality of notch spaces 114, and a plurality of air-drawing holes 115 and 116, and this vacuum forming mold has the construction as shown in the drawings. The base mold 112 is a plate-like member having a flat front surface 117, and the circuit member-installing portion 113, having a width substantially equal to a width of a circuit member 118 (which is not limited to an illustrated flat cable), and a suitable height, is formed on and projects from the front surface 117. A receiving recess 120 for receiving an end portion 119 of the circuit member 118 is formed in the front surface 117.

The circuit member-installing portion 113 is generally similar to the circuit member-installing portion 67 (see FIG. 12) of the above embodiment. Here, the difference is that a slanting surface 121 for introducing the end portion 119 of the circuit member 118 into the receiving recess 120 is formed.

The receiving recess 120 is formed into a channel-shape as shown in the drawings. The receiving recess 120 enables the long end portion 119 of the circuit member 118 to be easily processed at the time of molding the resin-molded panel. A holder portion 122 is provided in the receiving recess 120. The holder portion 122 is provided if necessary, and has, for example, a pin-like shape. The holder portion 122 serves to prevent the end portion 119, received in the receiving recess 120, from projecting outwardly therefrom, and even when the end portion 119, received in a bent manner in the receiving recess 120, produces a reaction force due to this bending, the holder portion 122 holds the end portion 119 to prevent this end portion from projecting outwardly beyond the front surface 117 of the base mold 112.

The circuit member-incorporating resin-molded panel 123 as shown in FIG. 24 is molded through first to third steps of a method of installing the circuit member in the resin-molded panel, using the vacuum forming mold 111 as described above. In FIG. 24, an imaginary line 124 indicates the position of the receiving recess 120 in a superimposed manner. In FIG. 24, reference numerals 125 denote retaining convex portions. Reference numerals 126 denote recesses formed respectively by circuit member-positioning portions 127 (see FIG. 23).

Figure 25:
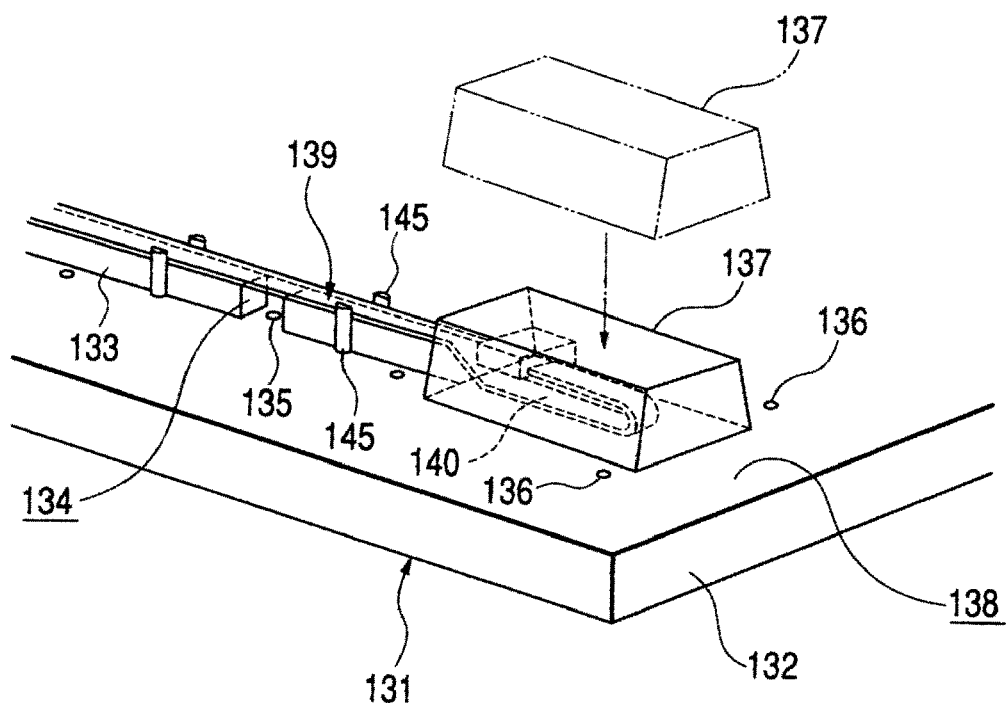
FIG. 25 is a perspective view of a further embodiment of a vacuum forming mold.
Figure 26:
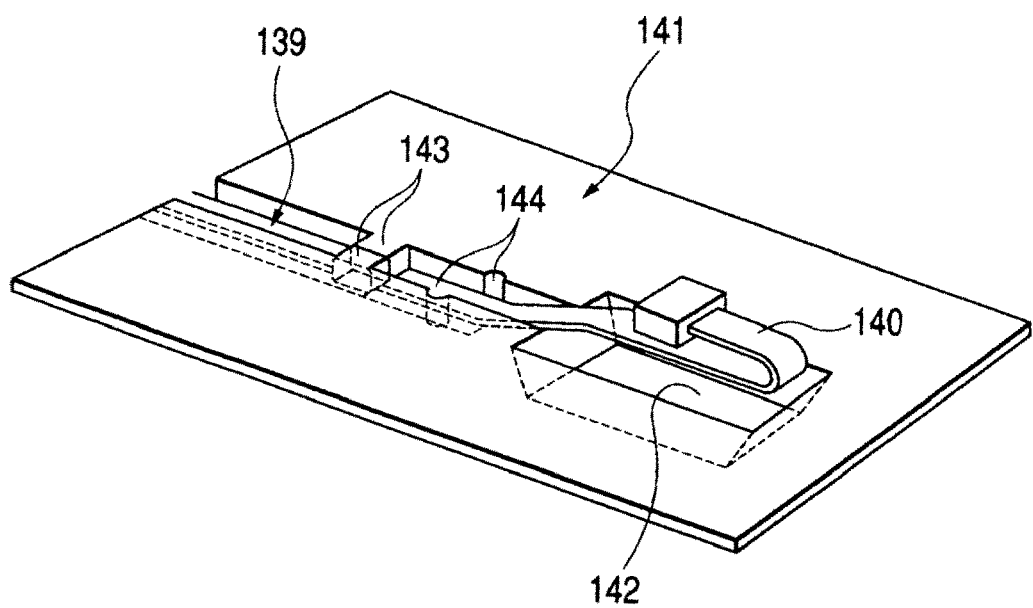
FIG. 26 is a perspective view showing the front side of a circuit member-incorporating resin-molded panel formed by the use of the vacuum forming mold of FIG. 25.

Next, a further embodiment of a vacuum forming mold of the invention will be described with reference to FIGS. 25 and 26. FIG. 25 is a perspective view of the vacuum forming mold of this embodiment. FIG. 26 is a perspective view showing the front side of a circuit member-incorporating resin-molded panel formed by the use of the vacuum forming mold of FIG. 25.

In FIG. 25, the vacuum forming mold 131 comprises a base mold 132, and includes a circuit member-installing portion 133, a plurality of notch spaces 134, and a plurality of air-drawing holes 135 and 136, and this vacuum forming mold has the construction as shown in the drawings. The base mold 132 is a plate-like member having a flat front surface 138, and the circuit member-installing portion 133, having a width substantially equal to a width of a circuit member 139 (which is not limited to an illustrated flat cable), and a suitable height, is formed on and projects from the front surface 138. A receiving box member 137 for receiving an end portion 140 of the circuit member 139 is releasably mounted on the front surface 138. The receiving box member 137 is formed into a box-shape, and has a similar function to that of the above-mentioned receiving recess portion 120 (see FIG. 23).

The circuit member-incorporating resin-molded panel 141 as shown in FIG. 26 is molded through first to third steps of a method of installing the circuit member in the resin-molded panel, using the vacuum forming mold 131 as described above. In FIG. 26, reference numeral 142 denotes a recess formed as a result of existence of the receiving box member 137. Reference numerals 143 denote retaining convex portions. Reference numerals 144 denote recesses formed respectively by circuit member-positioning portions 145 (see FIG. 25).

Figure 27:
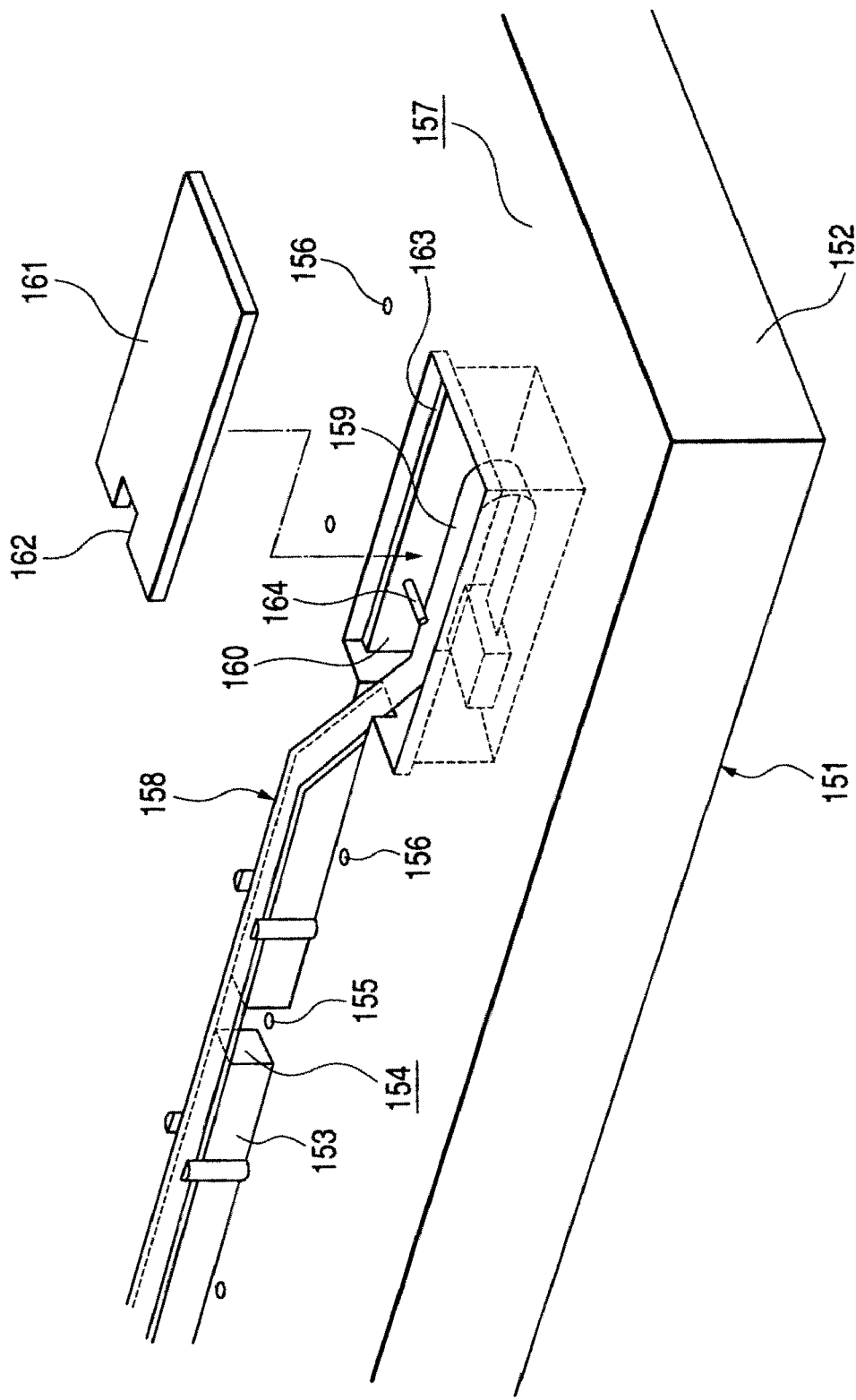
FIG. 27 is a perspective view showing a further embodiment of a vacuum forming mold.

Next, a further embodiment of a vacuum forming mold of the invention will be described with reference to FIGS. 27 and 28. FIG. 27 is a perspective view showing the vacuum, forming mold of this embodiment. FIG. 28 is a perspective view showing the vacuum forming mold of FIG. 27 and a circuit member, showing their appearances.

In FIG. 27, the vacuum forming mold 151 comprises a base mold 152, and includes a circuit member-installing portion 153, a plurality of notch spaces 154, and a plurality of air-drawing holes 155 and 156, and this vacuum forming mold has the construction as shown in the drawings. The base mold 152 is a plate-like member having a flat front surface 157, and the circuit member-installing portion 153, having a width substantially equal to a width of the circuit member 158 (which is not limited to an illustrated flat cable), and a suitable height, is formed on and projects from the front surface 157. Receiving recesses 160 for respectively receiving end portions 159 of the circuit member 158 are formed in the front surface 157. A lid member 161 is releasably provided at the receiving recess 160.

The receiving recess 160 has a similar function to that of the above-mentioned receiving recess 120 (see FIG. 23). The receiving recess 160 is formed into a channel-shape as shown in the drawings. The lid member 161 can close the receiving recess 160. When the receiving recess 160 is closed by the lid member 161, the front surface 157 of the base mold 152 and a front surface of the lid member 161 are disposed in a common plane. A notch 162, through which the end portion 159 of the circuit member 158 extends into the receiving recess 160, is formed in the lid member 161. Reference numeral 163 denotes a reception portion for the lid member 161. Reference numeral 164 denotes a holder portion (Here, the lid member 161 prevents the end portion 159 from projecting outwardly from the receiving recess, and therefore the provision of the holder portion 164 can be omitted.).

A circuit member-incorporating resin-molded panel (although not particularly shown), similar to that of FIG. 24, is molded through first to third steps of a method of installing the circuit member in the resin-molded panel, using the vacuum forming mold as described above. The lid member 161 has an advantage that it prevents the heated and softened panel material from falling into the receiving recess 160.

In FIG. 28, for example, illustrated removal means is provided at the receiving recess 160. This removal means assists in removing the lid member 161 from the receiving recess 161, and includes an air introduction passage 165 communicating with the receiving recess 160, and an air-introducing apparatus (not shown) for feeding the air into the receiving recess 160 via this air introduction passage 165. The removal means is thus provided, and therefore after the circuit member-incorporating resin-molded panel is molded, the air is introduced into the receiving recess 160 so as to exert a force of this air on the lid member 161, and by doing so, the removal operation can be effected easily.

Figure 29A:
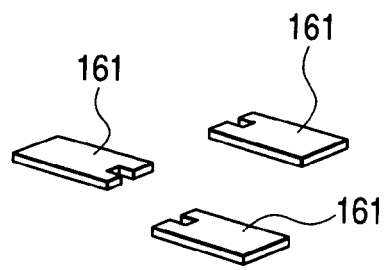
FIGS. 29A to 29C are three kinds of lid members, respectively.
Figure 29B:
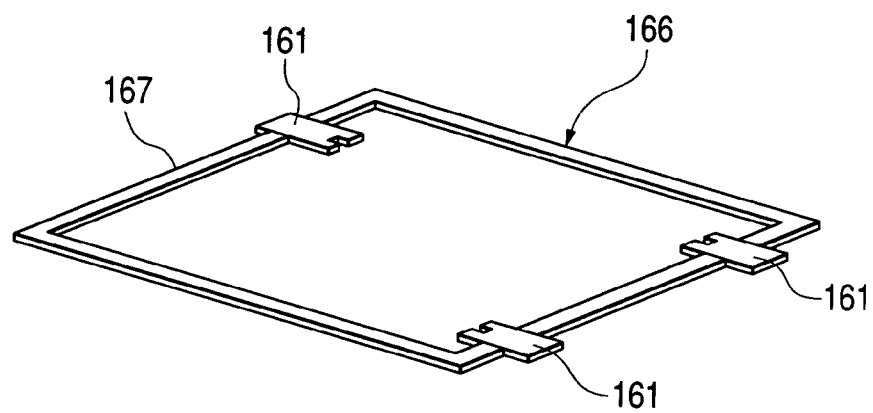
Figure 29C:
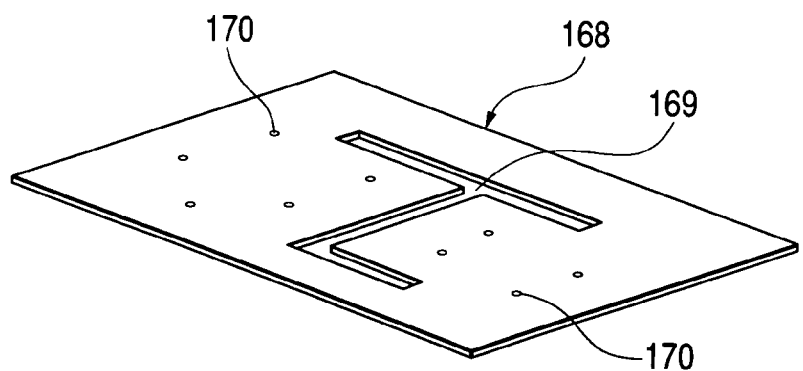

The lid member is not limited to the type shown in FIGS. 27 and 29A. Namely, for example, those types, shown respectively in FIGS. 29B and 29C, can be used. Because of the provision of an interconnecting portion 167, a lid member 166, shown in FIG. 29B, can be removed at one time without the need for removing a plurality of lid members 161 separately from the plurality of receiving recesses 160. With respect to a lid member 168 shown in FIG. 29C, a relief portion 169 for the circuit member-installing portion 153 (see FIG. 28) is formed through this lid member, and this lid member is adapted to cover the front surface 157 (see FIG. 28) of the base mold 152 over the entire area thereof. Reference numeral 170 denotes an air-drawing hole.

Figure 30:
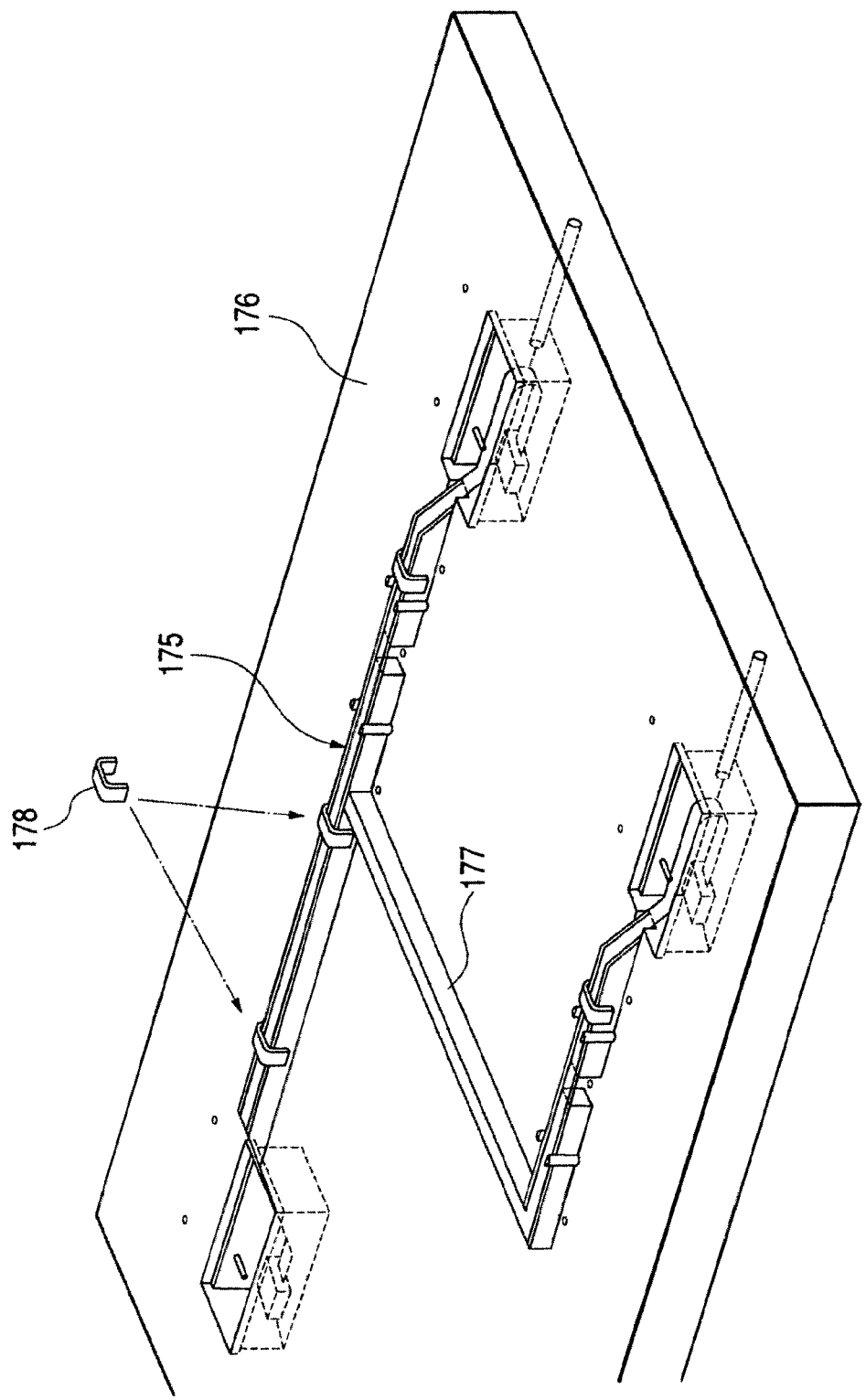
FIG. 30 is a perspective view showing a further embodiment of a method of the invention for installing a circuit member in a resin-molded panel.
Figure 31A:
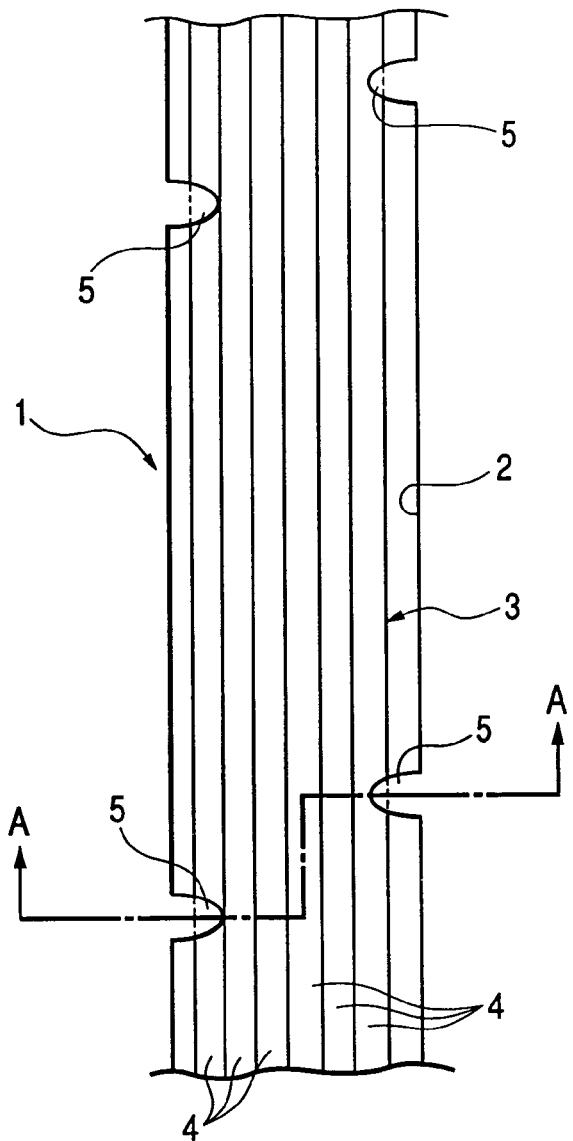
FIGS. 31A and 31B are views explanatory of a conventional method of installing a circuit member in a resin-molded panel.
Figure 31B:
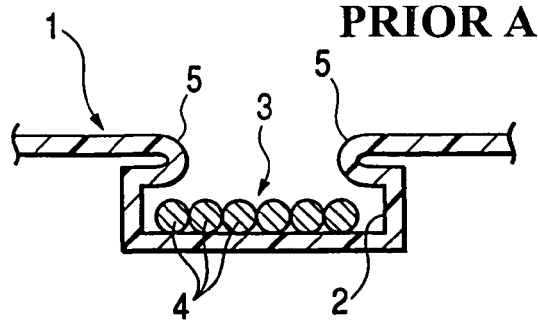
Figure 32A:
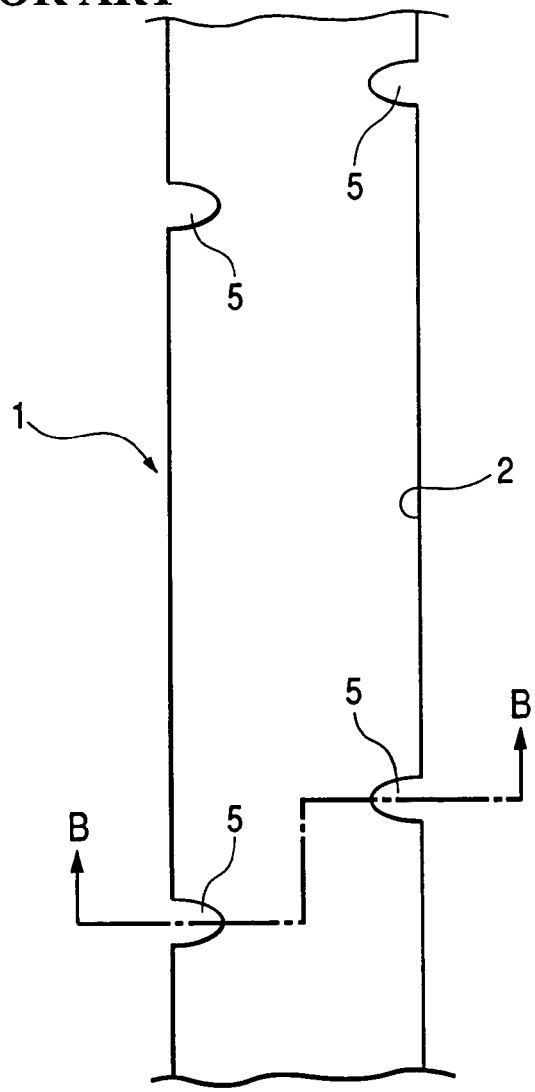
FIGS. 32A and 32B are views of the conventional resin-molded panel.
Figure 32B:
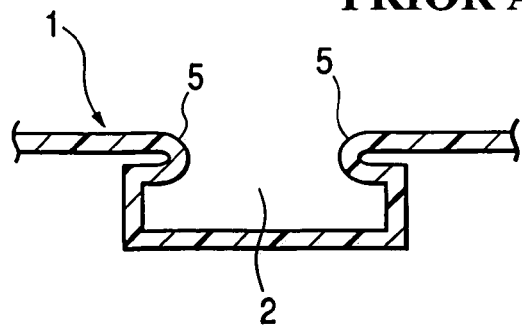

Next, a further embodiment of a method of the invention for installing a circuit member in a resin-molded panel will be described with reference to FIG. 30. FIG. 30 is a perspective view showing the further embodiment.

Referring to FIG. 30, in a first step, a circuit member 175 to be installed is placed on an upper surface of a circuit member-installing portion 177 on a base mold 176, and thereafter circuit member-holding members 178, which are separate from the circuit member-installing portion 177, are attached to the circuit member-installing portion 177. The circuit member-holding member 178 has, for example, a U-shape, and holds the circuit member 175 to prevent the same from lifting. After the circuit member-holding members 178 are attached, a second step as described above is carried out.

Various modifications can be made without departing from the scope of the present invention. The invention can be applied not only to the field of automobiles but also to various other industrial fields including the field of electric home appliances and the field of production apparatuses.

As described above, in the invention, the circuit member is installed in the resin-molded panel simultaneously when this resin-molded panel is vacuum formed, and besides any undercut portion is formed at the resin-molded panel. Therefore, the productivity and the operation efficiency can be enhanced as compared with the conventional construction. Furthermore, the resin-molded panel and the circuit member are held in intimate contact with each other, and therefore the fixed condition of the circuit member can be enhanced as compared with the conventional construction. In addition, the need for fastening members such as clamps is obviated, so that the increase of the cost can be suppressed.

In the invention, there can be provided the vacuum forming mold for performing the method of installing the circuit member in the resin-molded panel, which method can enhance the productivity, the operation efficiency and the fixed condition of the circuit member.

In the invention, the lifting of the circuit member is prevented by the use of the circuit member-holding member. Therefore, the installed condition of the circuit member after the molding is stable, and besides the constant quality of the production configuration is achieved.

In the invention, the notch space is formed to interrupt the circuit member-installing portion, and with this construction those opposed portions of the panel material, drawn into the notch space from the opposite sides of the circuit member, can be closely contacted with each other or fused together at their distal ends. Therefore, the circuit member can be more positively held and fixed.

In the invention, the notch space is formed by forming the notch such that the tapering surfaces are formed. With this construction, the heated and softened panel material can be smoothly drawn and fitted into this notch space. Therefore, the configuration quality of that portion of the resin-molded panel, fixedly holding the circuit member, is enhanced.

In the invention, there is provided the circuit member-holding portions for holding the circuit member therebetween. With this construction, the circuit member to be installed can be positively placed on the upper surface of the circuit member-installing portion without displacement. Therefore, the installed condition of the circuit member after the molding is stable, and the constant quality of the product configuration is achieved.

In the invention, there is provided the circuit member-positioning portions for insertion into the circuit member. With this construction, the circuit member to be installed can be positively placed on the upper surface of the circuit member-installing portion without displacement. Therefore, the installed condition of the circuit member after the molding is stable, and the constant quality of the product configuration is achieved.

In the invention, the lifting of the circuit member is prevented by the use of the circuit member-holding member. Therefore, the installed condition of the circuit member after the molding is stable, and the constant quality of the product configuration is achieved.

In the invention, there are provided the circuit member-positioning portions for holding the circuit member therebetween. With this construction, the circuit member to be installed can be positively placed on the base mold without displacement. Therefore, the installed condition of the circuit member after the molding is stable, and the constant quality of the product configuration is achieved.

In the invention, there are provided the circuit member-positioning portions for insertion into the circuit member. With this construction, the circuit member to be installed can be positively placed on the base mold without displacement. Therefore, the installed condition of the circuit member after the molding is stable, and the constant quality of the product configuration is achieved.

In the invention, the receiving recess is formed, and with this construction the processing of the end portion of the long circuit member at the time of molding can be effected easily. Therefore, the operation efficiency can be enhanced.

In the invention, the holder portion is formed, and with this construction the end portion, received in the receiving recess, is prevented from projecting outwardly therefrom. Therefore, the constant quality of the production configuration after the molding is achieved.

In the invention, the lid member is releasably attached to the receiving recess portion to close the same, and with this construction the heated and softened panel material is prevented from falling into the receiving recess. Therefore, the constant quality of the production configuration after the molding is achieved.

In the invention, there is provided the removal means, and with this construction the end portion, received in the receiving recess, can be easily taken out from this recess after the molding. Therefore, the efficiency of the lid member-removing operation can be enhanced.

In the invention, the removal means includes the air introduction passage, and the air introducing apparatus. With this construction, the pressure of the air can be exerted on the lid member. Therefore, the efficiency of the lid member-removing operation can be enhanced.

In the invention, the receiving box member is releasably mounted on the base mold, and with this construction the processing of the end portion of the long circuit member at the time of molding can be effected easily. Therefore, the operation efficiency can be enhanced.

What is claimed is:

1. A method of installing a circuit member in a resin-molded panel, comprising the steps of:
   a first step of placing the circuit member to be installed on an upper surface of a circuit member-installing portion formed on and projecting from a front surface of a base mold of a vacuum forming mold;
   a second step of laying, after said first step, a heated and softened panel material on said front surface of said base mold in a manner to cover at least a first surface of said circuit member placed on said upper surface of said circuit member-installing portion; and
   a third step of drawing, after said second step, the air between said panel material and said base mold via a notch space, formed by cutting upper and side surfaces of said circuit member-installing portion, and an air-drawing hole formed in said base mold and communicating with said notch space, thereby forming retaining portions which project into the notch space by drawing and fitting the heated and softened panel material around side surfaces of the circuit member and at least a portion of a second surface of the circuit member, which is opposed to the first surface;
   wherein said circuit member is installed in the resin-molded panel simultaneously when said resin-molded panel is vacuum formed.

2. A method of installing a circuit member in a resin-molded panel according to claim 1, wherein before said second step, a circuit member-holding member, which is separate from said circuit member-installing portion, is attached to said circuit member-installing portion to prevent the lifting of said circuit member.

3. A method of installing a circuit member in a resin-molded panel, comprising the steps of:
   a first step of placing the circuit member to be installed on an upper surface of a circuit member-installing portion formed on and projecting from a front surface of a base mold of a vacuum forming mold;
   a second step of laying, after said first step, a heated and softened panel material on said front surface of said base mold in a manner to cover at least a first surface of said circuit member placed on said upper surface of said circuit member-installing portion; and
   a third step of drawing, after said second step, the air between said panel material and said base mold via a step space, formed by a step between an axial end of said circuit member-installing portion and said base mold, and an air-drawing hole formed in said base mold and communicating with said step space, thereby forming retaining portions which project into the step space by drawing and fitting the heated and softened panel material around side surfaces of the circuit member and at least a portion of a second surface of the circuit member, which is opposed to the first surface;
   wherein said circuit member is installed in the resin-molded panel simultaneously when said resin-molded panel is vacuum formed.

4. A method of installing a circuit member in a resin-molded panel according to claim 3, wherein before said second step, a circuit member-holding member, which is separate from said circuit member-installing portion, is attached to said circuit member-installing portion to prevent the lifting of said circuit member.

5. A method of installing a circuit member in a resin-molded panel, comprising the steps of:
- a first step of placing the circuit member to be installed on a front surface of a base mold of a vacuum forming mold astride a recess formed in said front surface of said base mold;
- a second step of laying, after said first step, a heated and softened panel material on said front surface of said base mold in a manner to cover at least a first surface of said circuit member; and
- a third step of drawing, after said second step, the air between said panel material and said base mold via said recess and an air-drawing hole formed in said base mold and communicating with said recess such that a portion of the panel material is drawn into the recess so as to form retaining portions in the heated and softened panel material which are fitted in the recess space and cover at least a portion of a second surface of the circuit member, which is opposed to the first surface;
- wherein said circuit member is installed in the resin-molded panel simultaneously when said resin-molded panel is vacuum formed.

6. A method of installing a circuit member in a resin-molded panel according to claim 1, wherein said air-drawing hole is formed immediately below said notch space in said base mold.

7. A method of installing a circuit member in a resin-molded panel according to claim 1, wherein said circuit member-installing portion projects a predetermined height and has a width substantially identical to a width of the circuit member.

8. A method of installing a circuit member in a resin-molded panel according to claim 1, wherein said notch space is formed on opposite sides of a predetermined position of said circuit-member installing portion.

9. A method of installing a circuit member in a resin-molded panel according to claim 1, wherein said notch space is formed so as to traverse a predetermined position of said circuit-member installing portion.

10. A method of installing a circuit member in a resin-molded panel according to claim 3, wherein said air-drawing hole is formed immediately below said step space in said base mold.

* * * * *